(12) United States Patent
Kadowaki et al.

(10) Patent No.: US 6,728,192 B1
(45) Date of Patent: Apr. 27, 2004

(54) TRACKING ERROR SIGNAL DETECTION SYSTEM FOR OPTICAL RECORDING MEDIUM

(75) Inventors: Shin-ichi Kadowaki, Osaka (JP); Shinichi Tanaka, Kyoto (JP); Seiji Nishiwaki, Osaka (JP); Kousei Sano, Osaka (JP); Seiji Nishino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/421,025

(22) Filed: Oct. 19, 1999

Related U.S. Application Data

(62) Division of application No. 09/206,589, filed on Dec. 7, 1998, now Pat. No. 6,009,054, which is a division of application No. 08/676,540, filed on Jul. 9, 1996, now Pat. No. 5,892,741.

(30) Foreign Application Priority Data

| Jul. 10, 1995 | (JP) | 7-173123 |
| Sep. 22, 1995 | (JP) | 7-244784 |
| Sep. 25, 1995 | (JP) | 7-246209 |
| Oct. 4, 1995 | (JP) | 7-257616 |

(51) Int. Cl.$^7$ .................................. G11B 7/00
(52) U.S. Cl. ........................ 369/112.01; 369/118
(58) Field of Search ................ 369/44.23, 44.29, 369/44.35, 112.01, 112.03, 112.16, 118

(56) References Cited

U.S. PATENT DOCUMENTS

| 4,125,859 | A | * 11/1978 | Oshida et al. .......... 369/111 |
| 4,446,548 | A | 5/1984 | Bouwhuis et al. |
| 4,775,968 | A | 10/1988 | Ohsato |
| 4,958,245 | A | 9/1990 | Roth et al. |
| 5,065,387 | A | 11/1991 | Roth et al. |
| 5,287,338 | A | 2/1994 | Sato |
| 5,341,353 | A | 8/1994 | Yoshio et al. |
| 5,406,545 | A | 4/1995 | Kadowaki |
| 5,587,985 | A | 12/1996 | Sano et al. |
| 5,633,846 | A | 5/1997 | Okuyama et al. |
| 5,974,011 | A | * 10/1999 | Nakane .................... 369/47.52 |
| 6,016,300 | A | * 1/2000 | Takeda et al. ......... 369/112.07 |

FOREIGN PATENT DOCUMENTS

| EP | 0 457 567 | 11/1991 |
| JP | 61-82388 | 4/1986 |

OTHER PUBLICATIONS

Communication from European Patent Office and attached Search Report, Apr. 24, 1998.

* cited by examiner

*Primary Examiner*—Paul W. Huber
(74) *Attorney, Agent, or Firm*—Merchant & Gould, P.C.

(57) ABSTRACT

In a magnetic recording medium to detect tracking error signals optically where an optical head and a magnetic head scan different tracks, two signals having phases different by $\pi/2$ are generated and added or subtracted. By changing the amplitude of the two signals with a changeable gain amplifying means, a phase of a tracking error signal is changed so that the servo operation is conducted at the middle of the amplitude of the tracking error signal to keep the magnetic head on track.

17 Claims, 33 Drawing Sheets

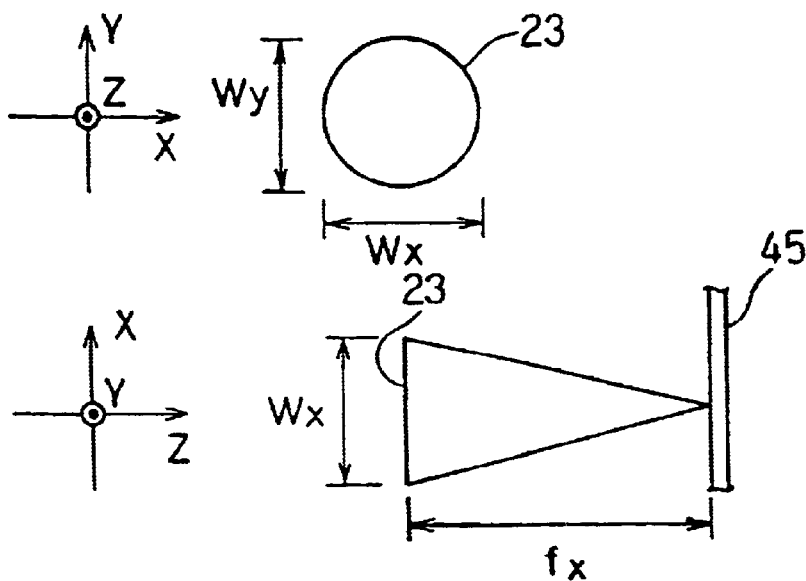
FIG. 17A
FIG. 17B
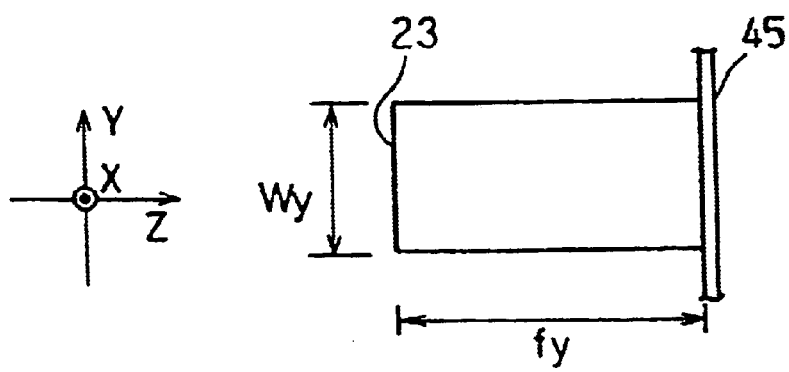
FIG. 17C

TRACKING ERROR SIGNAL DETECTION SYSTEM FOR OPTICAL RECORDING MEDIUM

This Application is a Division of Ser. No. 09/206,589 Filed Dec. 7, 1998 now Pat. No. 6,009,054, which is a division of Ser. No. 08/676,540 filed Jul. 9, 1996 now Pat. No. 5,892,741.

BACKGROUND OF THE INVENTION

1. Field of the Invention

The present invention relates to information recording media which comprise a high density information recording means such as an optical information recording medium including an optical disk or a magnetic information recording medium including a fixed magnetic disk or a floppy disk, a tracking error signal detection apparatus for the information recording media, and an information recording apparatus which can precisely record, reproduce and erase information on the information recording media using the tracking error signal detection apparatus, and also relates to methods of adjusting an information recording apparatus.

2. Disclosure of the Prior Art

A track pitch of a conventional magnetic recording media on which information is recorded, such as a floppy disk. Therefore, the track pitch is much wider than that of an optical disk, which is about 1.6 μm. Accordingly, a rough track location using a mechanical method such as a stepping motor has been sufficient. However, in order to realize a magnetic recording medium having a larger capacity, a track pitch from several μm to several tens μm m is required. In this case, a precise track location becomes necessary.

FIG. 1 shows a configuration of a conventional magnetic recording apparatus which detects a tracking error signal by using light. In FIG. 1, a linearly polarized divergent beam 70 radiated from a semiconductor laser light source 10 is converted to a parallel beam by a collimator 20 and the parallel. beam enters a polarizing beam splitter 30. All the parallel beam 70 entering the polarizing beam splitter 30 passes through the polarizing beam splitter 30 and enters a ¼ wavelength plate 31. The parallel beam 70 is converted to a circularly polarized beam by passing through the ¼ wavelength plate 31 and is focused on a magnetic recording medium 40 by an object lens 21.

FIG. 2 shows the relationship between the magnetic recording medium 40 and the focused light beam 70. The magnetic recording medium 40 has tracks Tn−1, Tn, Tn+1 . . . , which include the area on which information is recorded or reproduced by a magnetic head 99 with a certain pitch pt (approximately 20 μm). Further, discrete guiding grooves Gn−1, Gn, Gn+1 . . . , which enable the optical detection of a signal synchronizing A tracking error signal and which enables rotations of the magnetic recording medium 40, are formed in the middle of adjacent tracks.

The beam 70 reflected and diffracted by the magnetic. recording medium 40 passes through the object lens 21 again, and enters the ¼ wavelength plate 31. By passing through the ¼ wavelength plate 31 again, the beam 70 is converted to a linearly polarized beam having a 90° phase change of the light source 10. All the beam passing through the ¼ wavelength plate 31 is reflected by the polarizing beam splitter 30 and enters a photodetector 50. The incident light beam is converted into an electric signal by the photodetector 50 and inputted to a signal processing portion 80.

As illustrated in FIG. 1, the photodetector 50 has two light sensing portions 501, 502. Signals outputted from the light sensing portions 501, 502 are converted to voltage signals by current-voltage (I-V) converting portions 851, 852 respectively, and inputted to a differential operation part 871. The differential operation part 871 subtracts the two voltage signals outputted from the I-V converting portions 851, 852.

When a beam 70 from the optical system has a displacement x from the center of a guiding groove such as Gn on a magnetic recording medium 40, voltage signals v21, v22 outputted from the I-V converting portions 851, 852 become sine waves having opposite phases which can be approximately represented by the below mentioned formulae (1) and (2). The signals v21, v22 can be illustrated as FIG. 3(a) and (b).

$$v21 = -A \cdot \sin(2\pi \, x/\text{pt}) + B \quad (1)$$

$$v22 = A \cdot \sin(2\pi \, x/\text{pt}) + B \quad (2)$$

In the formulae (1) and (2), A is an amplitude and B is a DC component.

A signal v23 outputted from the I-V converting portion 871 can be represented by the below mentioned formula (3) and outputted from a terminal 801 as the tracking error signal.

$$v23 = 2 \cdot A \cdot \sin(2\pi x/pt) \quad (3)$$

The signal v23 can be illustrated as FIG. 3(c). The tracking error signal v23 outputted from the terminal 801 is inputted to a driving portion 90 to adjust relative positions of a magnetic recording medium 40 and a base 95 including a tracking error signal detection optical system 100 and a magnetic head 99 for recording and reproducing information so as to form a desired track on the magnetic recording medium 40. The tracking error signal detection method is known as the push pull method.

(First Problem)

In a conventional magnetic recording apparatus using a magnetic head 99 for recording and reproducing information, and an optical system 100 for the detection of a tracking error signal, a distance d between a point S1 at which the magnetic head 99 contacts a magnetic recording medium 40 and a focal point S2 of a beam 70 from the optical system needs to be at least several hundred μm to several mm. That is, the point S1 at which the magnetic head 99 contacts the magnetic recording medium 40 and the focal point S2 of the beam 70 scan different tracks on the magnetic recording medium 40.

In assembling a magnetic recording apparatus, the distance d is adjusted so as to have the working point of the tracking servo at the midpoint S3 of the signal amplitude of the tracking error signal v23 as illustrated in FIG. 3(c) when the point S1 is on a track of the magnetic recording medium 40. However, temperature or humidity change causes expansion or contraction of the magnetic recording medium 40 and the track pitch pt changes accordingly. Therefore, in the tracking operation at the point S3 using the tracking error signal v23 obtained from the optical system 100, the point S1 becomes off track and thereby drastically deteriorates the information reproduction characteristics.

In this case, for example, if a point S4 is the working point on the tracking error signal when the point S1 is on the track, a tracking servo can be enabled by applying an offset voltage to the tracking servo. However, the dynamic range of the orientation illustrated by the arrow D1 lowers and thereby deteriorate the followability in the case disturbance generates. Further, as the point S4 moves farther from the point S3, the servo gain of the tracking operation lowers. When the point S4 eventually reaches the point S5, a new problem occurs that the servo gain of the tracking becomes 0 thereby completely losing the tracking servo.

On the other hand, in an optical disk apparatus where the beam used to detect tracking error signals and the beam used to record information on the information recording medium are identical, a configuration forming a track on or between the guiding grooves so as to record and reproduce information with a further high density is proposed. However, in this configuration, when the relationship pt>$\lambda$/NA is satisfied where $\lambda$ is a wavelength of the beam radiated from the light source, NA is an numerical aperture of the object lens at the information recording medium side, and pt is a cycle of marks or guiding grooves formed on the information recording medium to enable the detection of the tracking error signals, a problem similar to the above mentioned problem occurs when the predetermined angle between the beam focused by the object lens and the information recording medium can not be sustained.

Specific examples include the case having a wavelength $\lambda$ of 650 nm, a numerical aperture NA of 0.6, a cycle pt of marks or guiding grooves of 1.48 $\mu$m, and a substrate thickness for the information recording medium of 0.6 mm.

(Second Problem)

Dusts or flaws on the magnetic recording medium 40 change the reflection ratio of the magnetic recording medium 40 and the intensity of a light beam 70 reflected thereby accordingly. In this case, a problem occurs in that an offset occurs in the tracking error signal, and thus the magnetic head 99 can not be controlled on a desired track of the magnetic recording medium 99.

(Third Problem)

Moreover, as in the above mentioned prior art, if a stepping motor is used in the tracking driving portion 90 for a magnetic recording medium having a track pitch of several $\mu$m to several tens $\mu$m for seeking tracking error signals using a light beam, an off track generates which depends on the step width of the stepping motor. By making the step width narrower to reduce the off track amount, a problem occurs in that the time for detecting tracks becomes longer. These two problems can be solved by the use of a DC motor instead of a stepping motor in the tracking driving system. However, since mechanical positioning can not be controlled if a DC motor is employed in a tracking driving portion 90, a new problem occurs in that information can not be recorded or reproduced in a magnetic recording medium having a track pitch of 188 $\mu$m, which is now widely used.

(Fourth Problem)

Further, an optically optimum value for a numerical aperture NA of the object lens 21 for a magnetic recording medium having a track pitch of 50 $\mu$m is about 0.017. However, when an angular dislocation $\theta$ exists between the beam 70 focused by the object lens 21 and the magnetic recording medium 40, the beam 70 reflected by the magnetic recording medium 40 can not enter the aperture. Therefore a problem occurs in that the quantity of the light beam introduced to the photodetector 50 decreases and thus the tracking operation becomes unstable. The relationship between a performance function Ev with respect to the angular dislocation $\theta$ (Ev=0.5·tan(2·$\theta$)/NA) and a quantity of light I of the beam 70 introduced by the photodetector 50 is shown in FIG. 4. With a numerical aperture NA for the object lens 21 of 0.017, the angular dislocation $\theta$ is 0.97 when the quantity of light I of the beam 70 on the photodetector 50 is 0, namely, the performance function Ev is 1. In this case, the tracking error signal can not be obtained at all.

SUMMARY OF THE INVENTION

A first object of the present invention is to provide a tracking error signal detection apparatus which can realize a tracking servo operation with a constant stability without deteriorating the dynamic range or the gain of the tracking error signal.

That is, a first tracking error signal detection apparatus of the present invention comprises a light source to radiate a light beam, a converging optical system to converge the light beam radiated from the light source on a reflecting body in a minute spot, a beam splitting means to split the light beam reflected and diffracted by the reflecting body, a photodetector to sense the beam splitted by the beam splitting means and output a signal according to the quantity of light, a first arithmetic means to process a signal outputted from the photodetector, a changeable gain amplifying means to change the intensity of the signal outputted from the arithmetic means and output at least two signals, and a second arithmetic means to add or subtract the two signals outputted from the changeable gain amplifying means.

In the above mentioned configuration, the movement of the working point in the tracking error signal can be detected as the phase change of the signal outputted from the second arithmetic means by processing the two signals outputted from the changeable gain amplifying means by the second arithmetic means. In this case, by sustaining the amplitude of the tracking error signal at a certain level and operating the tracking servo operation at the middle of the amplitude of the tracking error signal, the magnetic head can be positioned properly on the track.

A second object of the present invention is to provide a tracking error signal detection apparatus which is not liable to generate the offset in the tracking error signal even when a reflection ratio of the information recording medium changes partially.

That is, a second tracking error signal detection apparatus of the present invention comprises a light source to radiate a light beam, a converging optical system to converge the light beam radiated from the light source on a reflecting body in a minute spot, a beam splitting means to split the light beam reflected and diffracted by the reflecting body, a photodetector to sense the beam splitted by the beam splitting means and output a signal according to the quantity of light, and a signal processing portion to process the signal outputted from the photodetector to generate a tracking error signal, wherein a cyclic physical change which changes the reflecting ratio is formed on the reflecting body so as to have a magnitude of a light beam in the orientation parallel to the physical change larger than the magnitude of the light beam in the orientation orthogonal to the physical change.

In the above mentioned configuration, the change of the beam intensity depending on the partial reflecting ratio change of the reflecting body can be reduced by enlarging the magnitude of the beam focused on the reflecting body. Thus a tracking error signal having little offset can be detected.

A third object of the present invention is to provide a magnetic recording apparatus which can detect a tracking error signal on either a magnetic recording medium having a track pitch of several $\mu$m to several tens $\mu$m or a magnetic recording medium having a track pitch of 188 $\mu$m.

In order for the third object, a first magnetic recording apparatus of the present invention comprises a light source to radiate a light beam, a first converging optical system to converge the light beam radiated from the light source on a first reflecting body in a minute spot, a second converging optical system to converge the light beam radiated from the light source on a second reflecting body in a minute spot, a beam splitting means to split the light beams reflected and diffracted by the first and second reflecting bodies, an photodetector to sense the beams splitted by the beam splitting means and output signals according to the quantity of light, a magnetic head to record information on the information recording medium or to reproduce information on the information recording medium, a signal processing portion to generate a tracking error signal from a plurality of signals outputted from the photodetector, and a control means to control the tracking of the magnetic head with respect to the information recording medium based on the tracking error signal, wherein a cyclic physical change is formed on the first and second reflecting bodies, and the cycle of the physical change formed on the first reflecting body and the cycle of the physical change formed on the second reflecting body are different.

In the above mentioned configuration, since a tracking error signal can be generated using a light beam reflected by the first reflecting body for a magnetic recording medium having a track pitch of several $\mu$m to several tens $\mu$m, and a tracking error signal can be generated using a light beam reflected by the second reflecting body for a magnetic recording medium having a track pitch of a 188 $\mu$m, a tracking operation can be conducted on magnetic recording media having different tracking pitches.

A fourth object of the present invention is to provide a magnetic recording apparatus which can detect a tracking error signal stably even when an angle dislocation θ exists between the beam 70 focused by the object lens 21 and the magnetic recording medium 40, and an adjusting method thereof.

That is, a second magnetic recording apparatus of the present invention comprises a light source to radiate a light beam, a converging optical system to converge the light beam radiated from the light source on a reflecting body in a minute spot, a beam splitting means to split the light beam reflected and diffracted by the reflecting body, an photodetector to sense the beam splitted by the beam splitting means and output a signal according to the quantity of light, and a magnetic head to record information on the information recording medium or to reproduce information on the information recording medium, wherein a cyclic physical change which changes the reflecting ratio is formed on the reflecting body and further comprises any of the belong mentioned components (1) to (3):

(1) two mirrors formed integrally on a common supporting body to change the orientation of a beam on the optical path extending from the light source to the reflecting body, (2) a converging optical system having an aperture in the second orientation larger than an aperture in the first orientation with the premise that the orientation of the cyclic physical change of the reflecting body is the first orientation and the orientation orthogonal to the first orientation is the second orientation, and (3) a converging optical system having a diffraction element formed in the vicinity thereof.

An adjusting method in assembling a magnetic recording apparatus of the present invention wherein the magnetic recording apparatus comprises a light source to radiate a light beam, a converging optical system to converge a light beam radiated from the light source on a reflecting body in a minute spot, a beam splitting means to split the light beam reflected and diffracted by the reflecting body, a photodetector to sense the beam splitted by the beam splitting means and output a signal according to the quantity of light, and a magnetic head to record information on the information recording medium or to reproduce information on the information recording medium, wherein the light source is located in a position orthogonal to the optical axis of the converging optical system so as to have a predetermined angle formed by the beam focused by the converging optical system and the reflecting body.

By having the component (1), an angle dislocation between the optical axis of the beam focused by the converging optical system and the magnetic recording medium caused by the installation error of the mirror used for reducing the area occupied by the optical system can be prevented since the movement of a mirror can be offset by the movement of another mirror.

By having the component (2), since an numerical aperture NA in the second orientation becomes larger, the effect of the vignetting of the light beam in the converging optical system caused by an angle dislocation between the optical axis of the beam focused by the converging optical system and the magnetic recording medium can be avoided.

By having the component (3), since a light beam in the converging optical system which moves depending on an angle dislocation between the optical axis of the beam focused by the converging optical system and the magnetic recording medium can be guided to an sensing element by the diffraction element, a vignetting of the light beam in the converging optical system can be prevented.

Accordingly, in any case, a magnetic recording apparatus which can stably detect a tracking error signal stablly can be provided.

Moreover, since an angle dislocation between the optical path of the light beam focused by the converging optical system and the magnetic recording medium caused by the installation error of elements comprising the magnetic recording apparatus can be compensated in the above mentioned adjusting method, a light beam reflected by the reflecting body can always return to enter the aperture of the lens, and thus a tracking error signal can be detected stably.

BRIEF DESCRIPTION OF THE DRAWINGS

FIGS. 17A to 17C are diagrams illustrating the configuration of a lens in the fifth embodiment.

DESCRIPTION OF THE PREFERRED EMBODIMENTS

Hereinafter, embodiments of information recording media, tracking error signal detection apparatus, information recording apparatus and adjusting methods of information recording apparatus will be explained in detail with reference to FIGS. 5 to 33. Same numerals are applied to components for which the same components can be used as the conventional magnetic recording apparatus. Further, "recording" in this specification refers to not only recording of information but also reproduction and erasure of information as well.

First Embodiment

Figure 5:
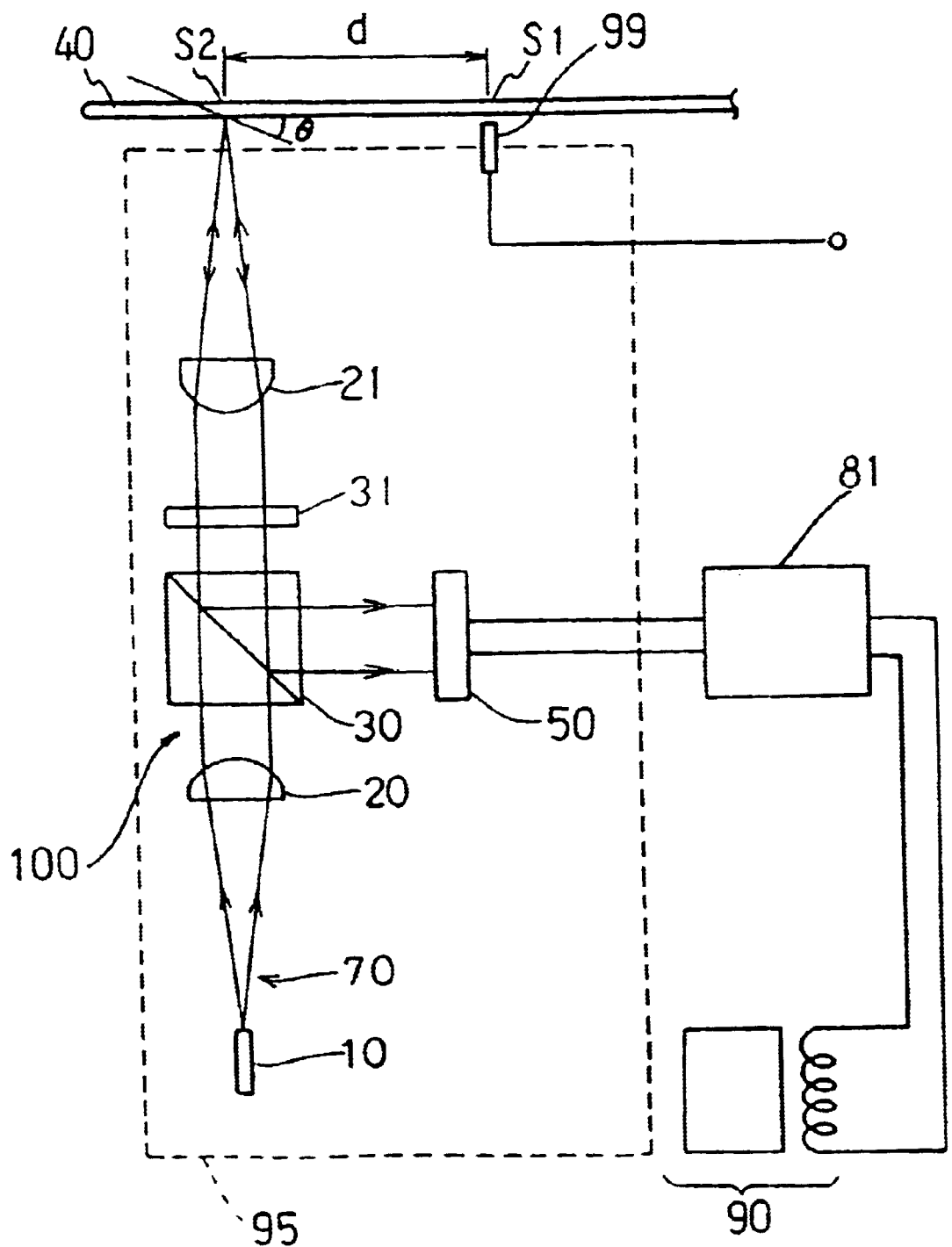
FIG. 5. is a diagram illustrating the configuration of a magnetic recording apparatus and a tracking error signal detection apparatus of the first embodiment of the present invention.
Figure 6:
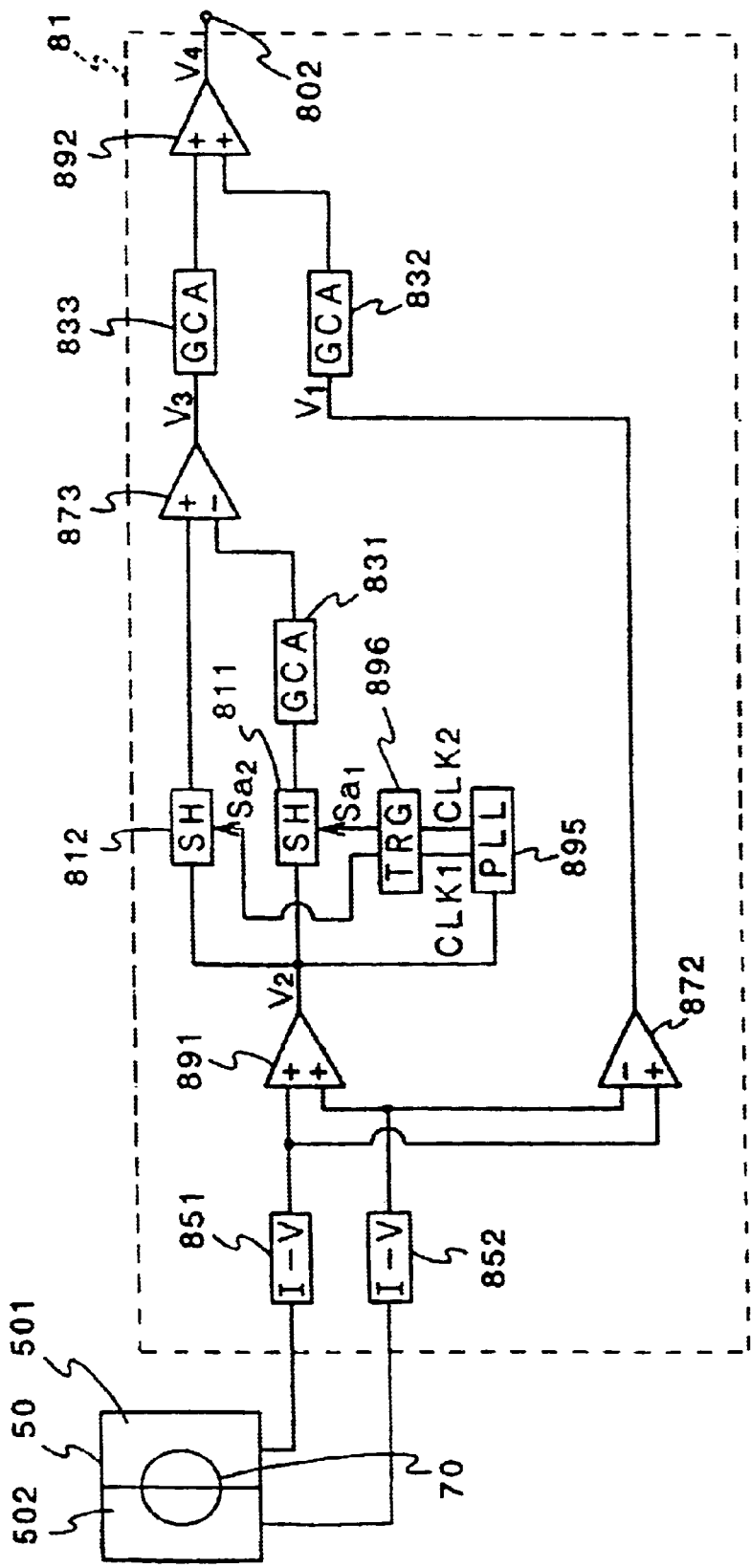
FIG. 6 is a diagram illustrating a signal processing portion of the first embodiment.

The first embodiment concerning a magnetic recording apparatus and the tracking error signal detection apparatus of the present invention will be explained with reference to FIGS. 5 to 8. FIG. 5 is a diagram illustrating a magnetic recording apparatus and a tracking error signal detection apparatus of the first embodiment. The tracking error signal detection apparatus of the magnetic recording apparatus of the first embodiment has substantially the same configuration as the prior art illustrated in FIG. 1 except the configuration of a signal processing portion 81. The configuration of the signal processing portion 81 of the first embodiment is illustrated in FIG. 6.

A photodetector 50 comprises two sensing portions 501, 502. Electric signals outputted from the sensing portions 501, 502 are inputted to a signal processing portion 81 respectively. The signals outputted from the sensing portions 501, 502 are converted to voltage signals by I-V converting portions 851, 852 respectively. Two voltage signals outputted from the I-V converting portions 851, 852 are inputted to a differential operation part 872 and an addition part 891 respectively. The differential operation part 872 subtracts two voltage signals outputted from the I-V converting portions 851, 852. A signal v1 outputted from the differential operation part 872 becomes a sine wave represented by the below mentioned formula (4) when a light beam 70 has a displacement x from the central portion of a groove (for example, Gn in FIG. 2). In the formula (4), A1 denotes an amplitude.

$$v1 = A1 \cdot \sin(2\pi x/pt) \tag{4}$$

A signal outputted from the differential operation part 872 is inputted to a changeable gain amplifying portions 832. The changeable gain amplifying portions 832 is an amplifier capable of changing an amplitude A1 of an inputted signal freely. A signal outputted from the changeable gain amplifying portions 832 is inputted to an operation part 892.

The addition part 891 adds voltage signals outputted from the I-V conversion portions 851, 852. A signal v2 outputted from the addition part 891 becomes a sine wave represented by the below mentioned formula (5). In the formula (5), A2 denotes an amplitude and B1 denotes a DC component.

$$v2 = A2 \cdot \cos(2\pi x/pt) + B1 \tag{5}$$

Figure 7:
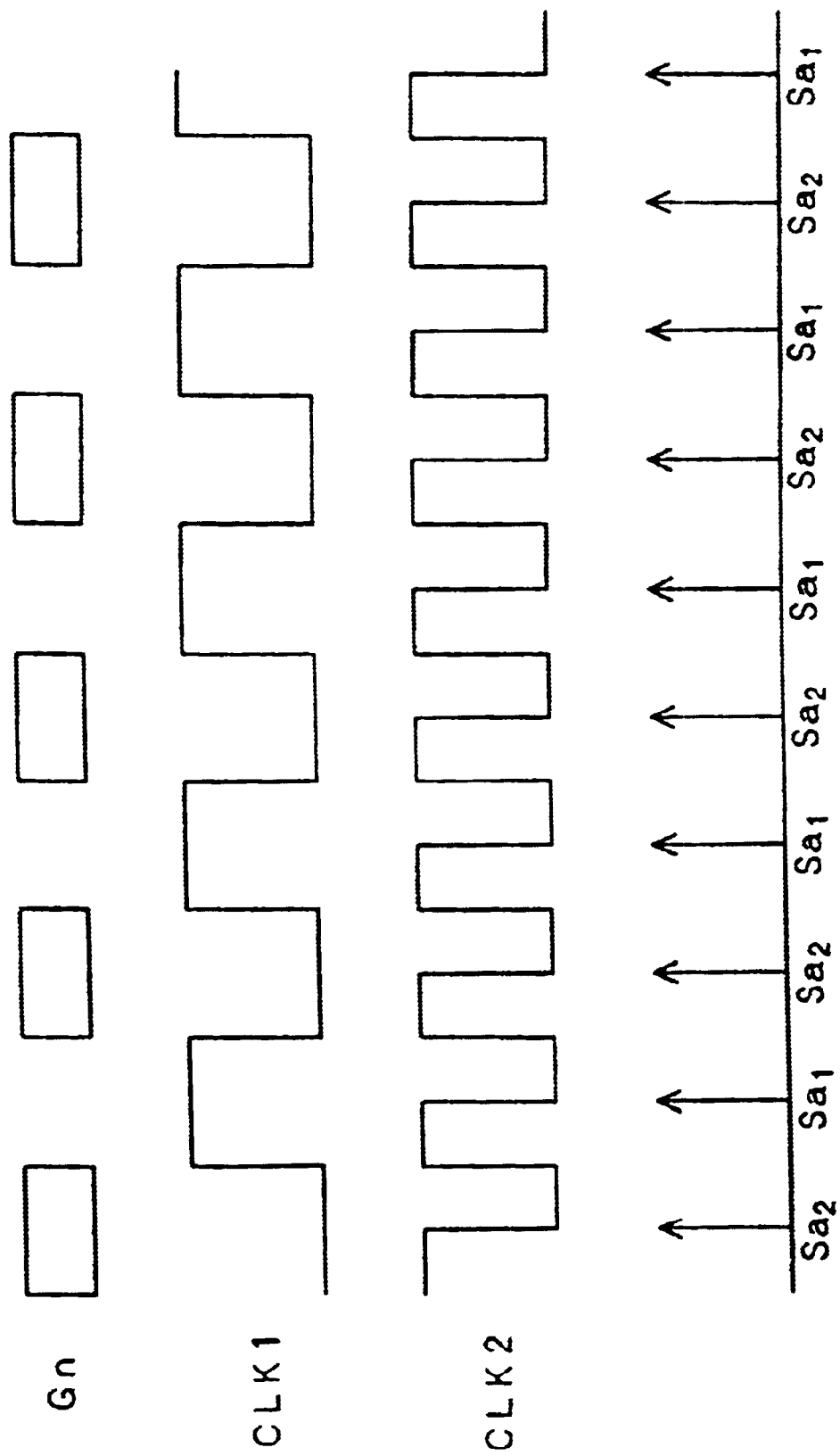
FIG. 7 is a diagram illustrating the relationship between guiding grooves of the magnetic recording medium and timing signals in the first embodiment.
Figure 8:
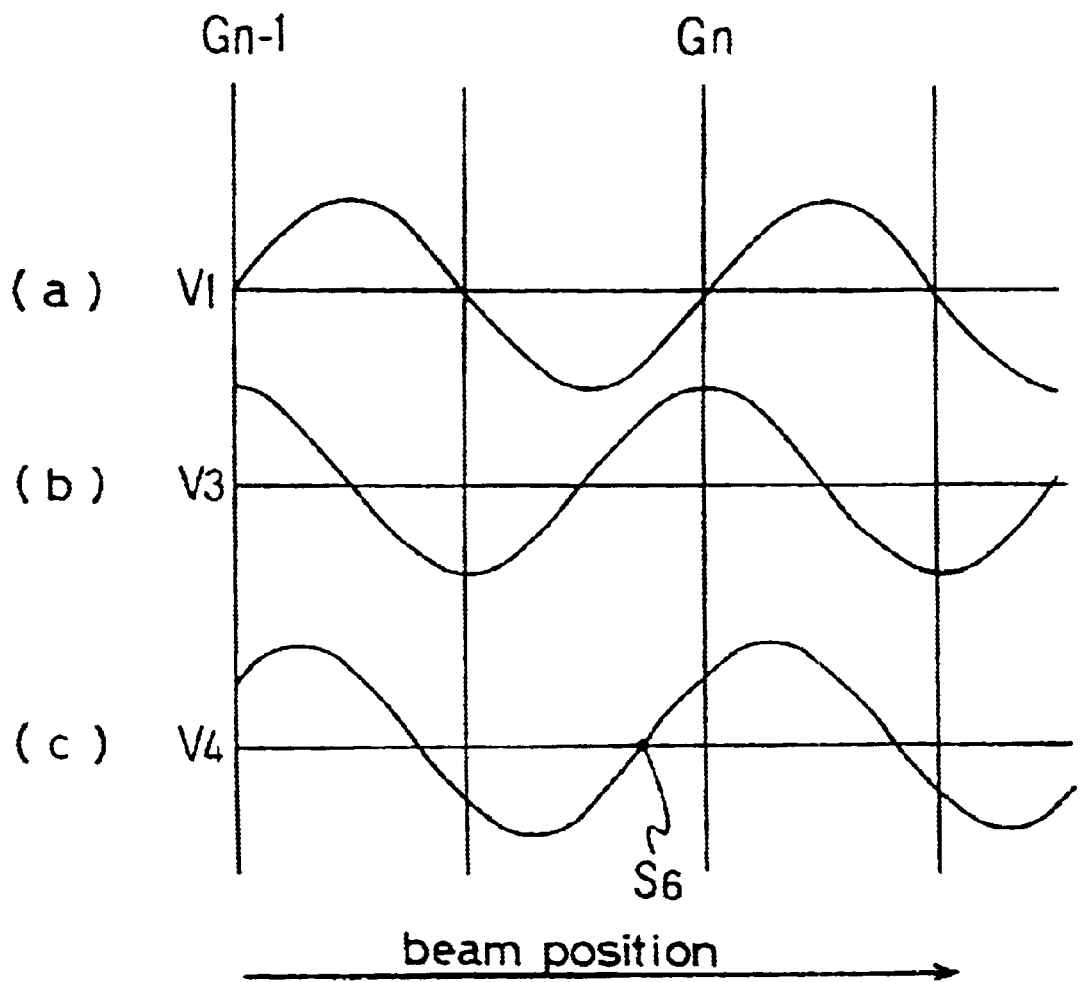
FIG. 8 is a graph illustrating signal wave forms of the signal processing portion of the first embodiment.

A signal outputted from the addition part 891 is inputted to a clock signal generating portion 895 to generate clock signals CLK1, CLK2. The clock signal generating portion 895 is a Phase Locked Loop (PLL) circuit. The clock signals CLK1, CLK2 synchronize with signals obtained by scanning discrete guiding grooves Gn−1, Gn . . . formed on the magnetic recording medium 40 illustrated in FIG. 2. FIG. 7 illustrates the relationship between the guiding groove Gn and the timing of clock signals CLK1, CLK2. The clock signals CLK1, CLK2 are inputted to a trigger signal generating portion 896 to generate timing signals Sa1, Sa2. A signal from the addition part 891 is outputted with the timing of the timing signals Sa1, Sa2 to be sampled and held by sample and hold portions 811, 812. A signal sampled and held by the sample and hold portion 812 is inputted to the differential operation part 873 as it is. On the other hand, a signal sampled and held by the sample and hold portion 811 is, after being adjusted to a favorable intensity by the changeable gain amplifying portions 831, inputted to the differential operation part 873. The gain of the changeable gain amplifying portions 831 is set to subtract the DC component B1 of the signal v2 at the differential operation part 873. In this case, a signal v3 outputted from the differential operation part 873 becomes a sine wave having the DC component subtracted from the signal v2 represented by the below mentioned formula (6).

$$v3 = A2 \cdot \cos(2\pi x/pt) \tag{6}$$

A signal outputted from the differential operation part 873 is, after being adjusted to a favorable amplitude by the changeable gain amplifying portion 833, inputted to an operation part 892. The operation part 892 adds an inputted signal to output a tracking error signal v4 to an output terminal 802. The signal v4 has a wave form represented by the below mentioned formula (7).

$$\begin{aligned} v4 &= K1 \cdot A1 \cdot \sin(2\pi\,x/\mathrm{pt}) + K2 \cdot A2 \cdot \cos(2\pi\,x/\mathrm{pt}) \\ &= K1 \cdot A1 \cdot \sin(2\pi\,x/\mathrm{pt}) + K2 \cdot A2 \cdot \sin(2\pi\,x/\mathrm{pt} + \pi/2) \end{aligned} \tag{7}$$

In the formula (7), K1, K2 are gains of the changeable gain amplifying portions 832, 833, respectively. A signal v4 can be a signal capable of setting an optional phase and an amplitude by selecting appropriate gains K1, K2. For example, when K1·A1=K2·A2, the signal v4 becomes a signal out of phase with respect to a signal v1 by π/4. Signals v1, v3, v4 can be illustrated as in FIGS. 8(*a*) to 8(*c*).

A tracking error signal v4 outputted from a terminal 802 is inputted to a driving portion 90. The driving portion 90 adjusts the relative position of a magnetic recording medium 40 and a base 95 comprising a tracking error signal detection optical system 100 and a magnetic head 99 for recording and reproduction of information tracked to the magnetic head 99 based on the tracking error signal v4 so as to have a magnetic head 99 tracked on a desired track.

Figure 1:
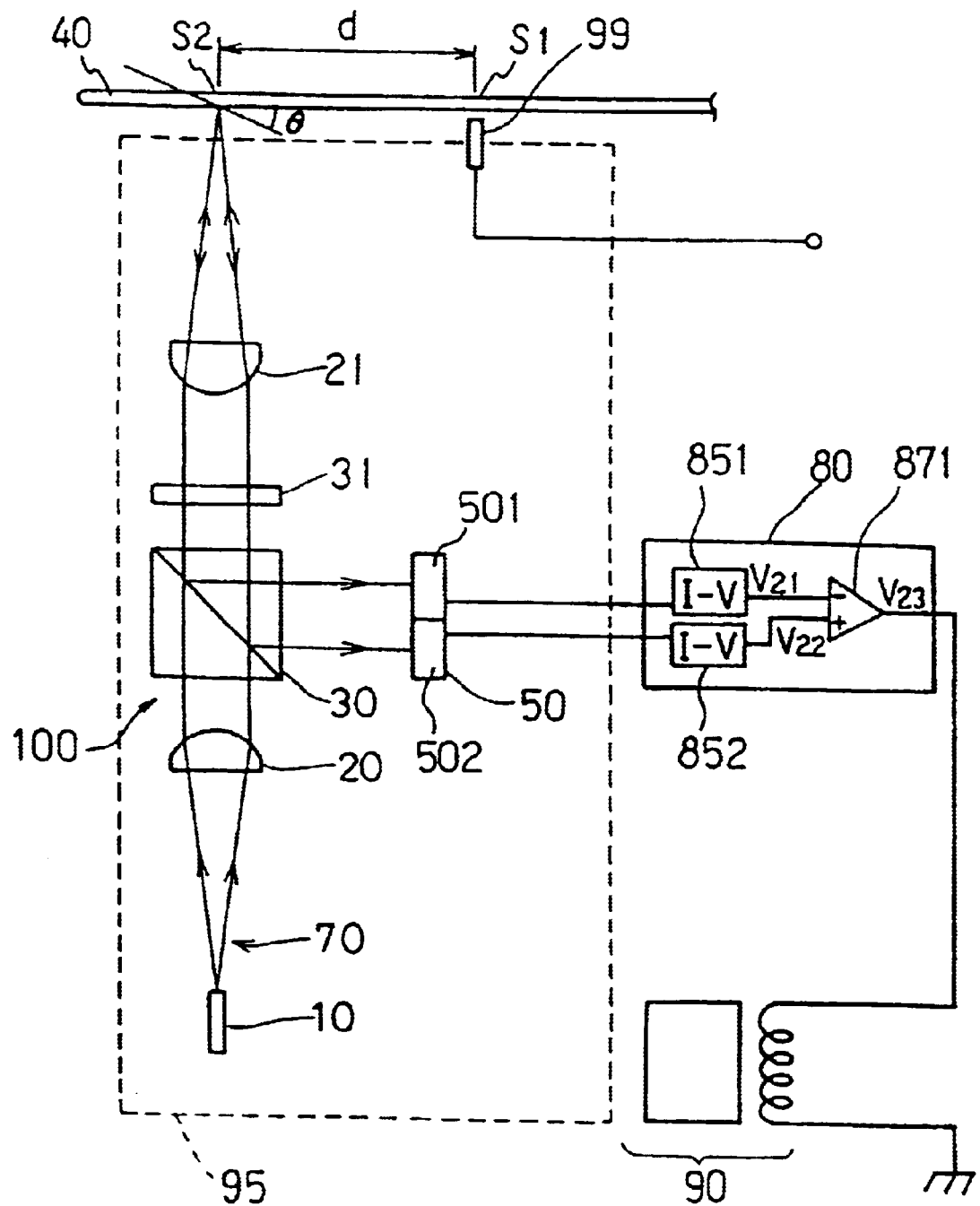
FIG. 1 is a diagram illustrating the configuration of a tracking error signal detection apparatus of a conventional magnetic recording apparatus.
Figure 3:
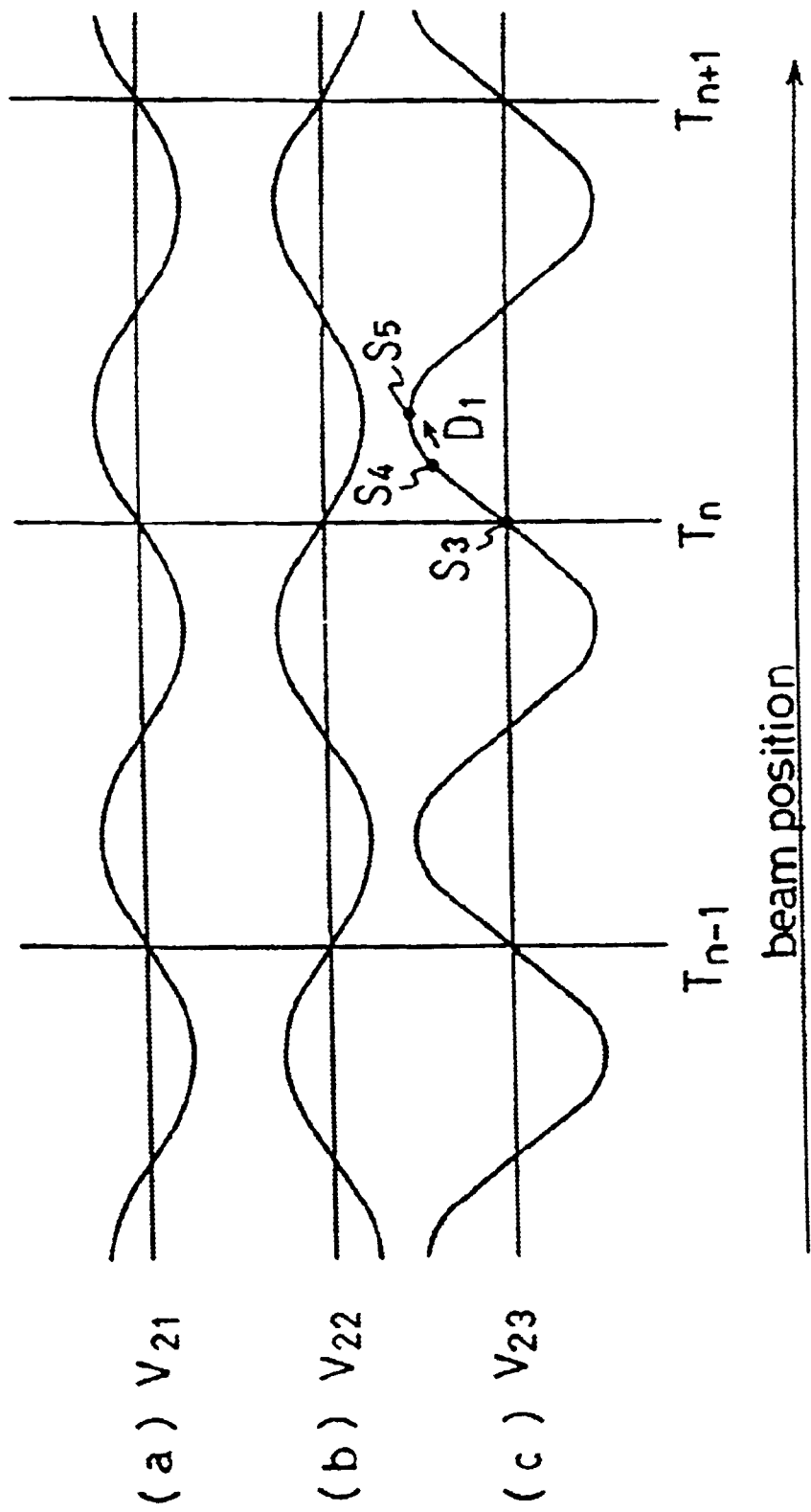
FIG. 3 is a graph illustrating signal wave forms of a signal processing portion in a conventional magnetic recording apparatus.
Figure 4:
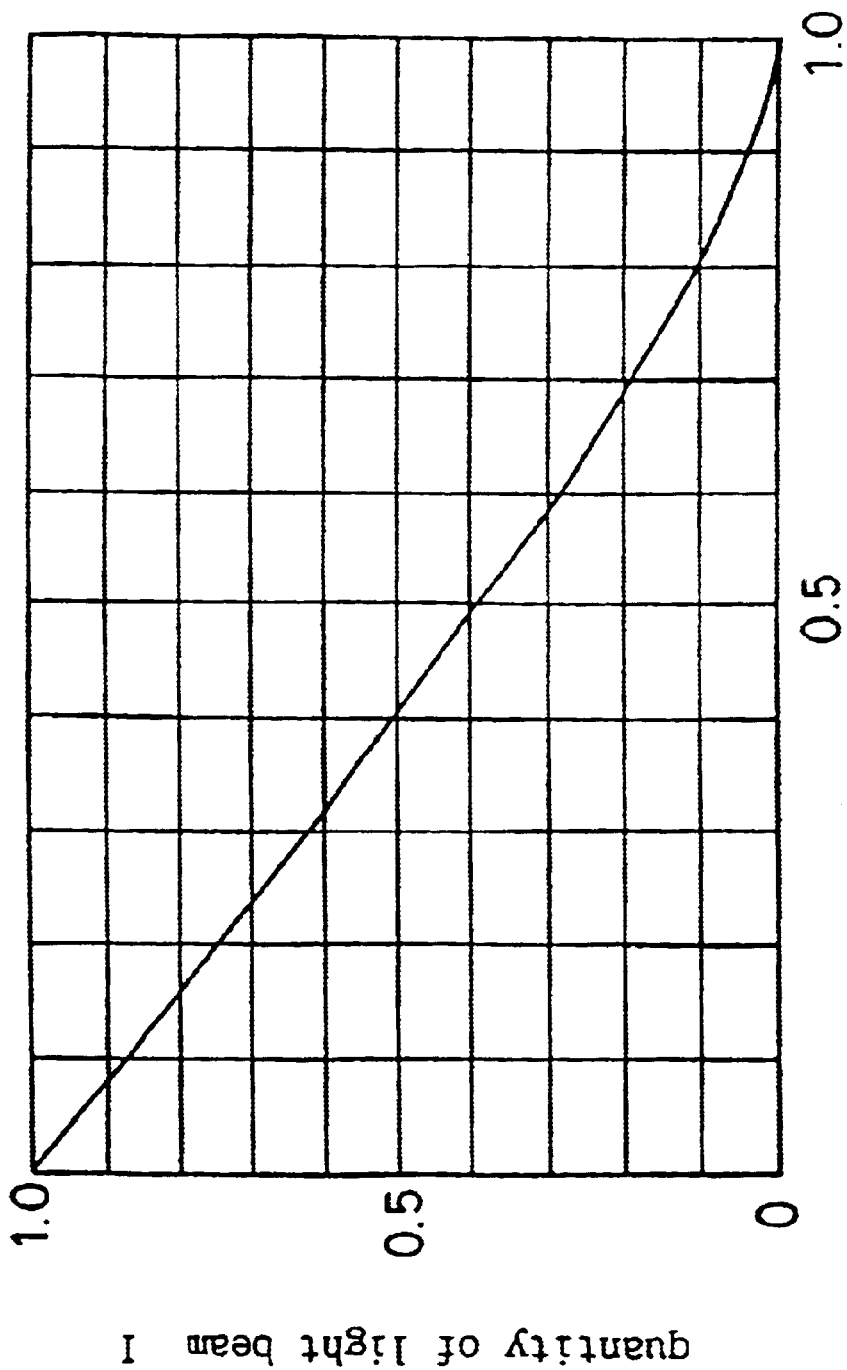
FIG. 4 is a graph illustrating a relationship between the tilt of a magnetic recording medium and a quantity of light incident on an object lens in a conventional magnetic recording apparatus.

In a magnetic recording apparatus as illustrated in FIG. 1, a point S1 at which the magnetic head 99 contacts with the magnetic recording medium 40 and a converging point S2 of a beam 70 from the optical system scan different tracks on the magnetic recording medium 40 respectively. On the other hand, when the magnetic recording medium 40 expands or contracts due to the change in temperature or humidity, the track pitch pt changes accordingly. However, in tracking using a tracking error signal obtained from the optical system 100 with a magnetic recording apparatus of the present invention, even when the point S1 is off track, by changing the gains of the changeable gain amplifying portions 832, 833, a point S1 can be on track at a midpoint of the amplitude of the tracking error signal. That is at the best point S3, a gain of the tracking servo and a dynamic range become maximum as illustrated in FIG. 3(*c*). In this case, information can be recorded or reproduced on the magnetic recording medium 40 in the best condition. Accordingly, the use of the magnetic recording apparatus of the present invention stabilizes the tracking operation significantly. Not only in the case of such temperature or humidity change, but also in the use of a magnetic recording apparatus using a changeable medium such as a floppy disk, tracking servo operation can be conducted at the best point. Further, a good interchangeability between different magnetic recording media can be provided.

The gains K1, K2 of the changeable gain amplifying portions 832, 833 can be adjusted to have a signal read out from the magnetic head 99 to be the best. As a method to adjust the gain of the changeable gain amplifying means, conventional methods such as changing the bias voltage applied on a semiconductor element, such as a PIN diode, a bipolar transistor and a field effect transistor (FET) can be employed.

Since a tracking error signal can be obtained with a simple optical system to focus a light beam on a magnetic recording medium in the magnetic recording apparatus of this embodiment, a magnetic recording apparatus having an inexpensive optical system can be provided.

Second Embodiment

Figure 9:
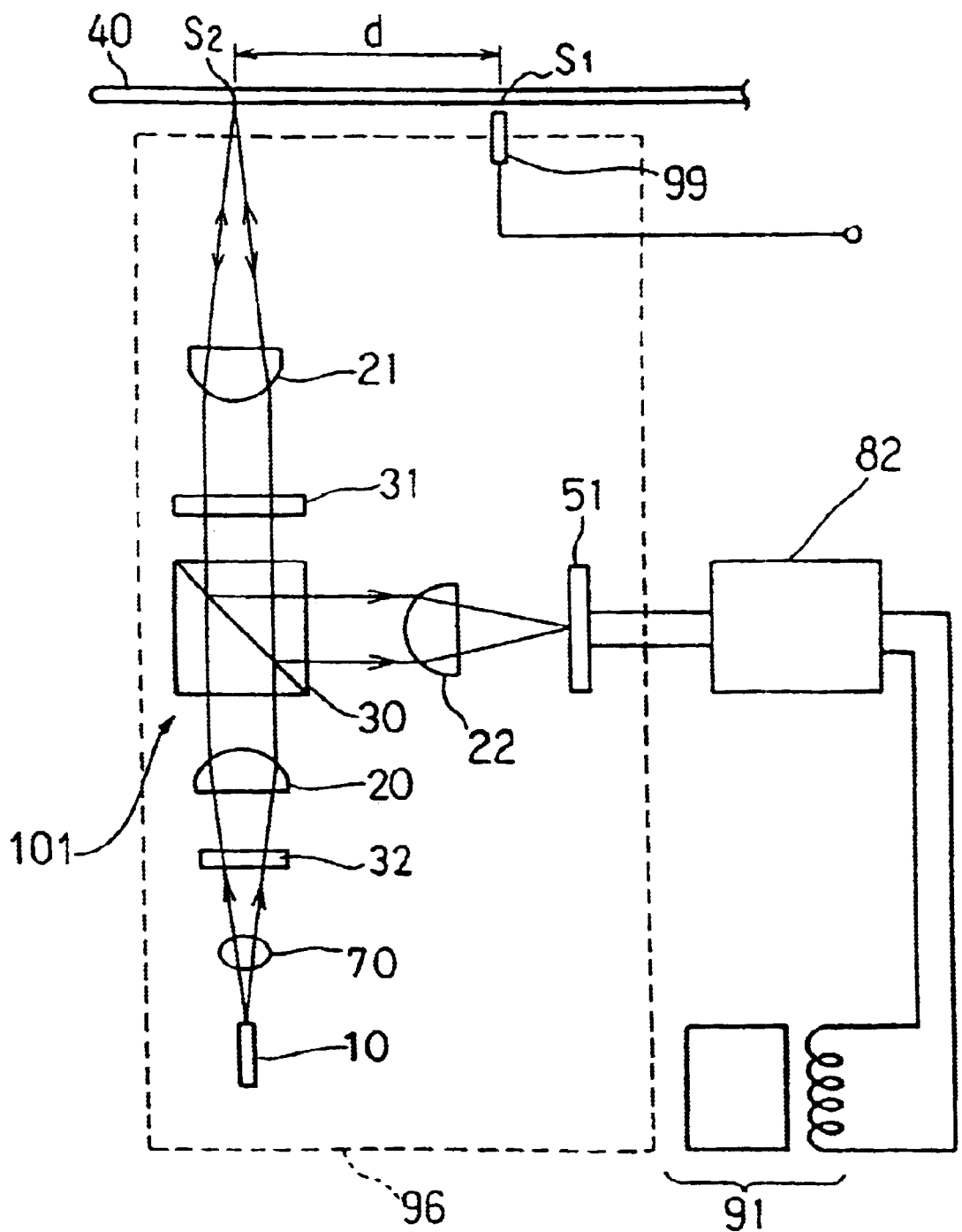
FIG. 9 is a diagram illustrating the configuration of a magnetic recording apparatus and a tracking error signal detection apparatus of the second embodiment.

The second embodiment concerning a magnetic recording apparatus and the tracking error signal detection apparatus of the present invention will be explained with reference to FIGS. 9 to 11. FIG. 9 is a diagram illustrating a magnetic recording apparatus and a tracking error signal detection apparatus of the second embodiment. The magnetic recording apparatus of the second embodiment has the same configuration as the first embodiment illustrated in FIG. 5 except that a diffraction grating 32 generates three beams between the light source 10 and the collimator 20, a beam 70 reflected by the polarizing beam splitter 30 is focused with a focusing lens 22, and a photodetector 51 and a signal processing portion 82 use a different configuration. The other components are the same as the first embodiment.

Figure 10:
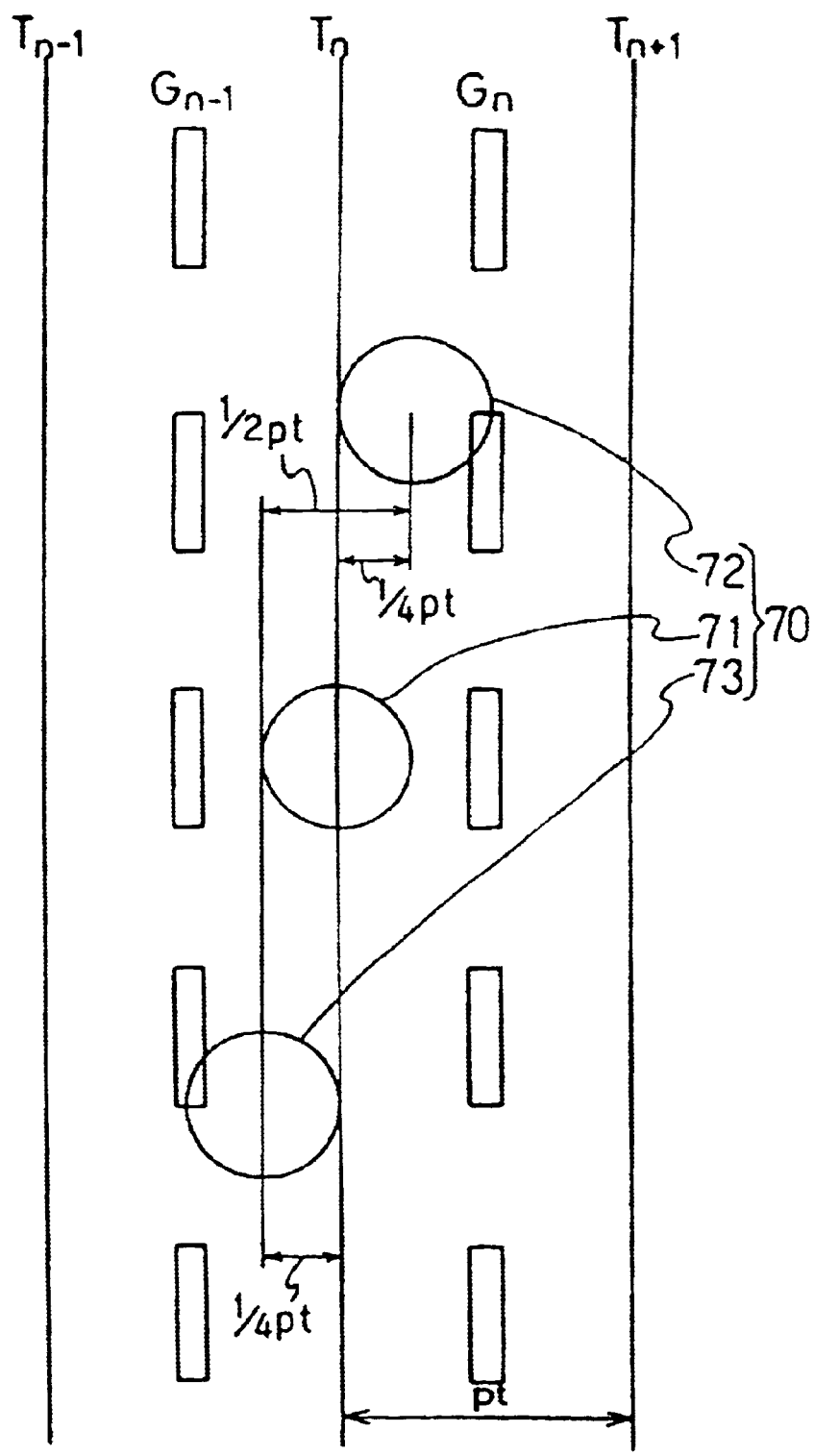
FIG. 10 is a diagram illustrating guiding grooves of the magnetic recording medium and timing signals in the second embodiment.

The beam 70 focused on the magnetic recording medium 40 is illustrated in FIG. 10. The beam 70 comprises three beams 71 to 73. The beam 71 is a zeroth-order diffracted light of the diffraction grating 32, and the beams 72, 73 are first-order diffracted lights of the diffraction grating 32, respectively. The beams 71, 72, 73 are located so as to radiate different positions of a track. Namely, the beams 71 and 72 and the beams 71 and 73 differ by pt/4 (pt:track pitch) respectively and the beams 72 and 73 differ by pt/2.

Figure 11:
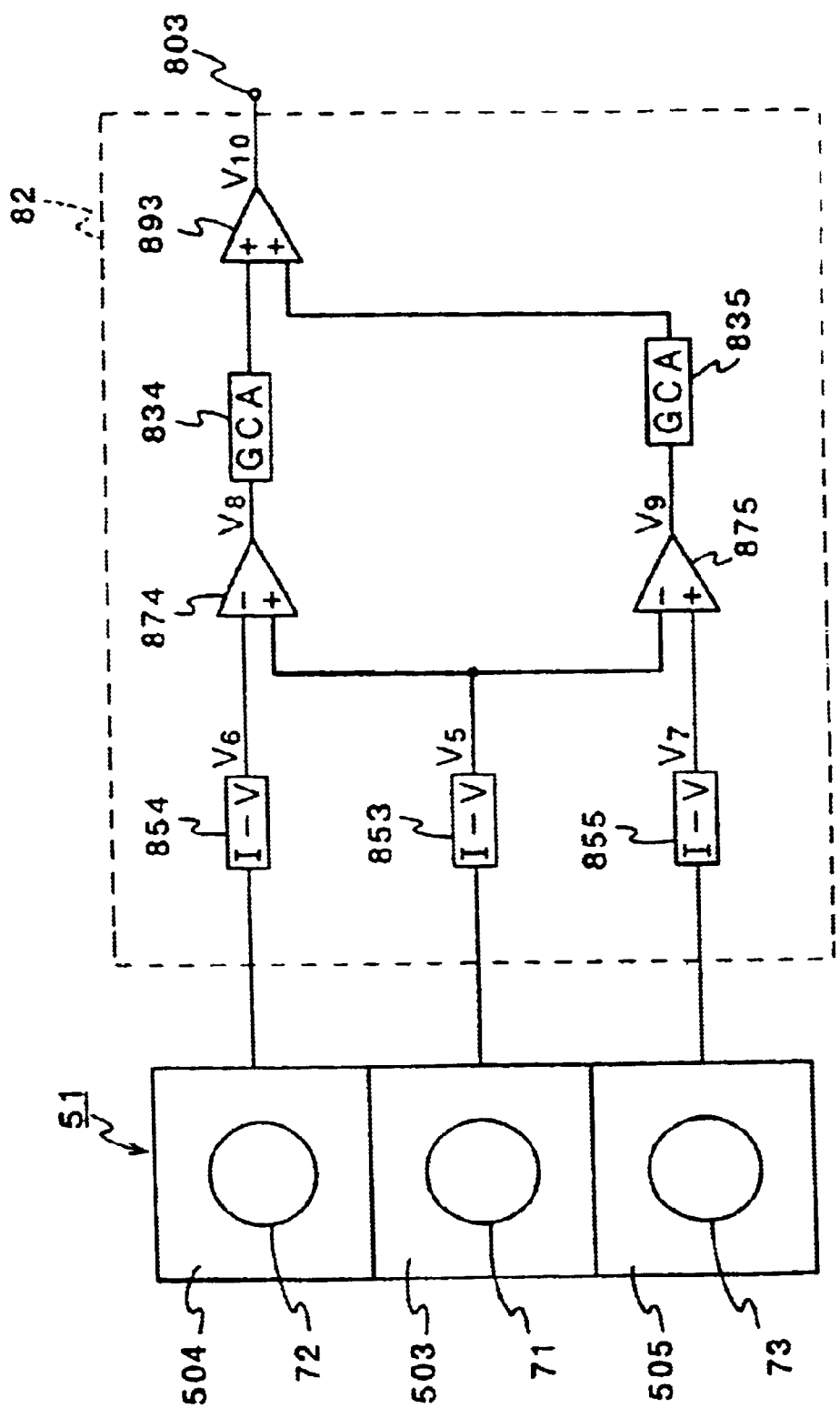
FIG. 11 is a diagram illustrating the signal processing portion in the second embodiment.

The configuration of an photodetector 51 and a signal processing portion 82 are illustrated in FIG. 11. The photodetector 51 comprises three sensing portions 503 to 505 for sensing beams 71 to 73, respectively. Electric signals outputted from the sensing portions 503 to 505 of the photodetector 51 are inputted to the signal processing portion 82 to be converted to voltage signals by I-V converting portions 853 to 855, respectively. Signals v5 to v7 outputted from the I-V converting portions 853 to 855 are inputted to the signal processing portion 82 to be converted to voltage signals. The signals v5 to v7 outputted from the I-V converting portions 853–855 are signals represented by the below mentioned formulae (8) to (10). In the formulae (8) to (10), A3 denotes an amplitude, and B2 denotes a DC component.

$$v5 = A3 \cdot \cos(2\pi\, x/\mathrm{pt}) + B2 \quad (8)$$

$$v6 = A3 \cdot \sin(2\pi\, x/\mathrm{pt}) + B2 \quad (9)$$

$$v7 = -A3 \cdot \sin(2\pi\, x/\mathrm{pt}) + B2 \quad (10)$$

Signals v5, v6 are inputted to a differential operation part 874, and signals v5, v7 are inputted to a differential operation part 875, respectively for subtraction. Signals v8, v9 outputted from the differential operation parts 874, 875 are signals represented by the below mentioned formulae (11) and (12). In the formulae (11) and (12), A4 denotes an amplitude.

$$v8 = A4 \cdot \sin(2\pi\, x/\mathrm{pt} + \pi/4) \quad (11)$$

$$v9 = A4 \cdot \sin(2\pi\, x/\mathrm{pt} - \pi/4) \quad (12)$$

Signals v8, v9 are sine waves out of phase by $\pi/2$. The signals v8, v9 outputted from the differential operation parts 874, 875 are inputted to the changeable gain amplifying portions 834, 835, respectively to be adjusted to a favorable amplitude, and inputted to the operation part 893. The operation part 893 conducts addition of inputted signals, and outputs a tracking error signal v10 to an output terminal 803. The signal v10 has a wave form represented by the below mentioned formula (13).

$$v10 = K3 \cdot A4 \cdot \sin(2\pi\, x/\mathrm{pt} + \pi/4) + K4 \cdot A4 \cdot \sin(2\pi\, x/\mathrm{pt} - \pi/4) \quad (13)$$

$$= K4 \cdot A4 \cdot \sin(2\pi\, x/\mathrm{pt} + \phi1) + K3 \cdot A4 \cdot \sin(2\pi\, x/\mathrm{pt} + \pi/2 + \phi1)$$

In the formula (13), K3, K4 are gains of the changeable gain amplifying portions 874, 875, respectively, and $\phi1$ is $-\pi/4$. A signal v10 can be a signal capable of setting optional phase and amplitude by selecting appropriate gains K3, K4. This can be easily understood in the comparison between the formula (13) and the formula (7) described in the first embodiment.

A tracking error signal v10 outputted to a terminal 803 is inputted to a driving portion 91. The driving portion 91 adjusts the relative position of a magnetic recording medium 40 and a base 96 comprising a tracking error signal detection optical system 101 and a magnetic head 99 so as to have a magnetic head 99 tracked on a desired track.

Figure 2:
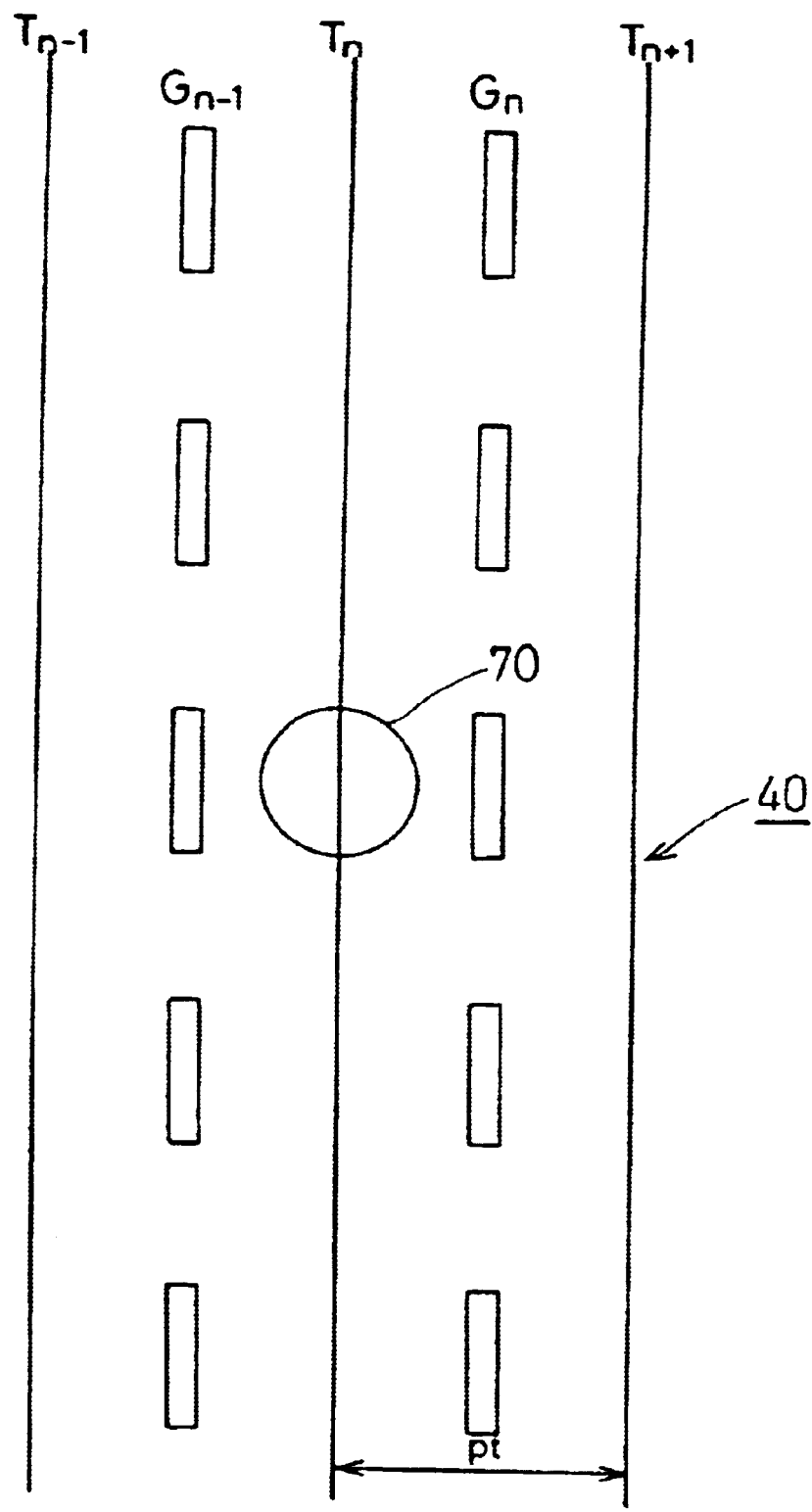
FIG. 2 is a diagram illustrating the relationship between a magnetic recording medium and a light beam in a conventional magnetic recording apparatus.

In a magnetic recording apparatus of FIG. 2, since the sample and hold operation is not conducted, guiding grooves Gn–1, Gn . . . need not have a discrete configuration. Thus, this embodiment can be applied also to a magnetic recording medium having a continuous guiding groove.

Third Embodiment

Figure 12:
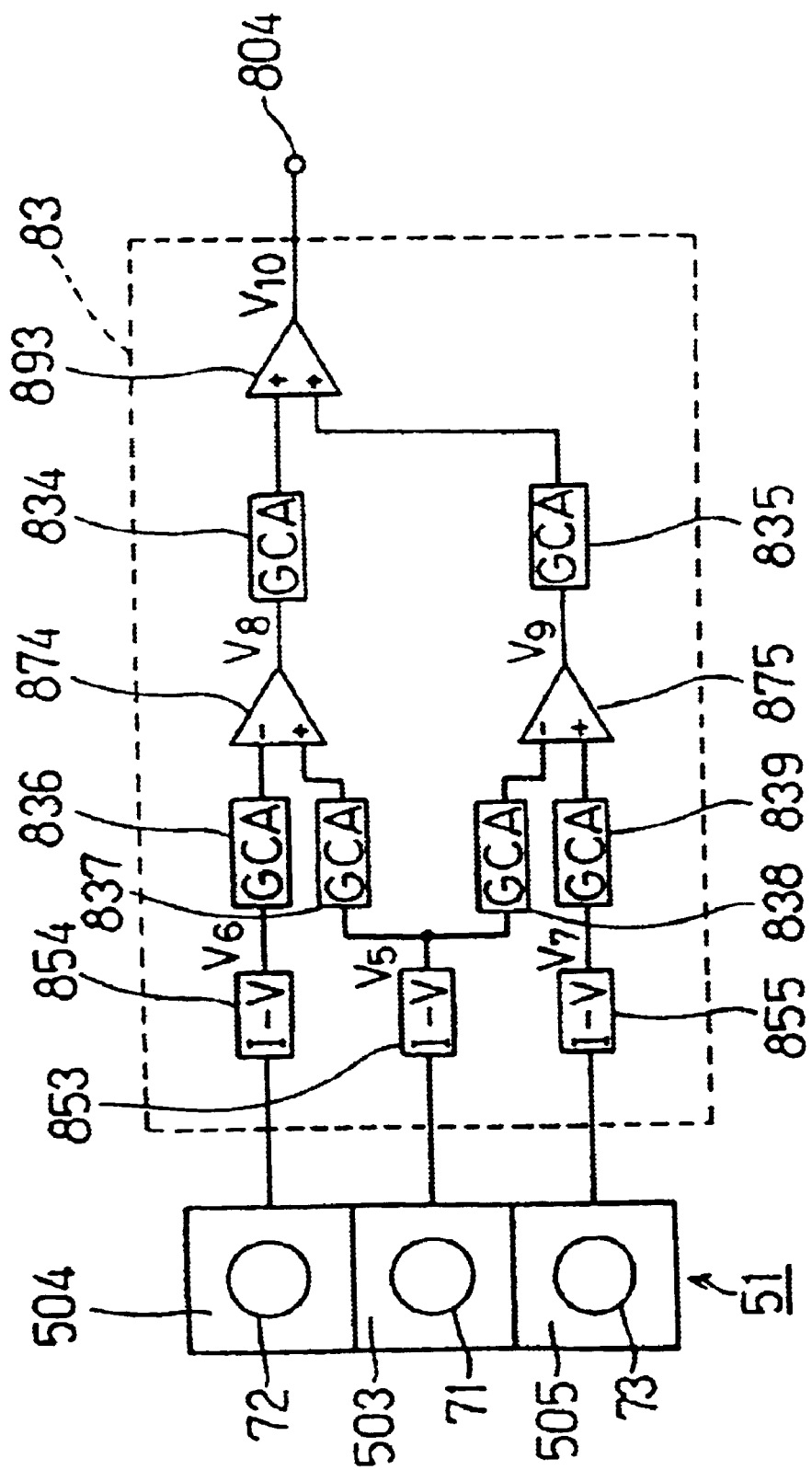
FIG. 12 is a diagram illustrating a magnetic recording apparatus and a signal processing portion of the tracking error signal detection apparatus of the third embodiment of the present invention.

The third embodiment concerning a magnetic recording apparatus and the tracking error signal detection apparatus of the present invention will be explained with reference to FIG. 12. FIG. 12 is a diagram illustrating the configuration of the signal processing portion 83 of the third embodiment. Since the configuration of the other parts are the same as the above mentioned second embodiment, details are not explained herein. The signal processing portion 83 illustrated in FIG. 12 differs from the signal processing portion 82 illustrated in FIG. 11 in that signals v5 to v7 are inputted to the differential operation parts 874, 875 via the changeable gain amplifying portions 836 to 839.

As in the second embodiment, three beams 71 to 73 are generated by the diffraction grating 32 illustrated in FIG. 9 and the beam 71 is a zeroth-order diffracted light of the diffraction grating 32, and the beams 72, 73 are first-order diffracted lights of the diffraction grating 32, respectively. The intensity of the first-order diffracted lights 72 and 73 can be formed identical comparatively easily even when the width, depth or shape of the lattice of the diffraction grating 32 has an irregularity in the production. On the other hand, in order to have the same intensity for the zeroth-order diffracted light 71 and the first-order diffracted lights 72, 73, the width, depth and shape of the lattice of the diffraction grating needs to be maintained precisely.

In the above mentioned second embodiment, when the intensity of the zero-order diffracted light 71 and the first-order diffracted lights 72, 73 is different, a DC component remains in a signal outputted from the differential operation parts 874, 875 and thus the DC component remains in the tracking error signal v10 as well. In general, even if a slight amount of DC component remains in a tracking error signal v10, the tracking servo operation is not disturbed. However, if the level of the residual DC component becomes larger due to a defect of the width, depth or shape of the lattice of the diffraction grating 32, the tracking servo operation may be unstable.

In the third embodiment, by arranging the changeable gain amplifying portions 836 to 839 at the input side of the differential operation parts 874, 875, the signal amplitude of inputted signals v5 to v7 can be adjusted to a favorable level. Accordingly, even if the intensities of the zeroth-order diffracted light 71 and the first-order diffracted lights 72, 73 generated at the diffraction grating 32 are different, a DC component contained in a signal outputted from the differential operation parts 874, 875 can be curbed to a sufficiently small level. The tracking error signals are outputted to a terminal 804.

In the third embodiment, even when the width, depth or shape of the lattice of the diffraction grating 32 has an irregularity in the production of a diffraction grating 32 to generate a plurality of diffracted lights, a stable tracking servo operation can be realized. Further, when the intensity distribution of the beam 70 radiated from the light source 10 is not uniform and thus the intensities of the diffracted lights 71 to 73 become different, this can also be tolerated without causing any problem. According to the configuration of the third embodiment, requirements toward the production accuracy of the lattice of a diffraction grating and the installation accuracy of the light source can be drastically alleviated to achieve the reduction of the diffraction grating costs and the assembly costs.

Fourth Embodiment

The fourth embodiment concerning a magnetic recording apparatus and the tracking error signal detection apparatus of the present invention will be explained with reference to FIGS. 13 and 14. The configuration of the fourth embodiment is similar to the configuration of the second embodiment except for the configuration of the photodetector and the signal processing portion. Therefore, details are not explained for the common parts.

Figure 13:
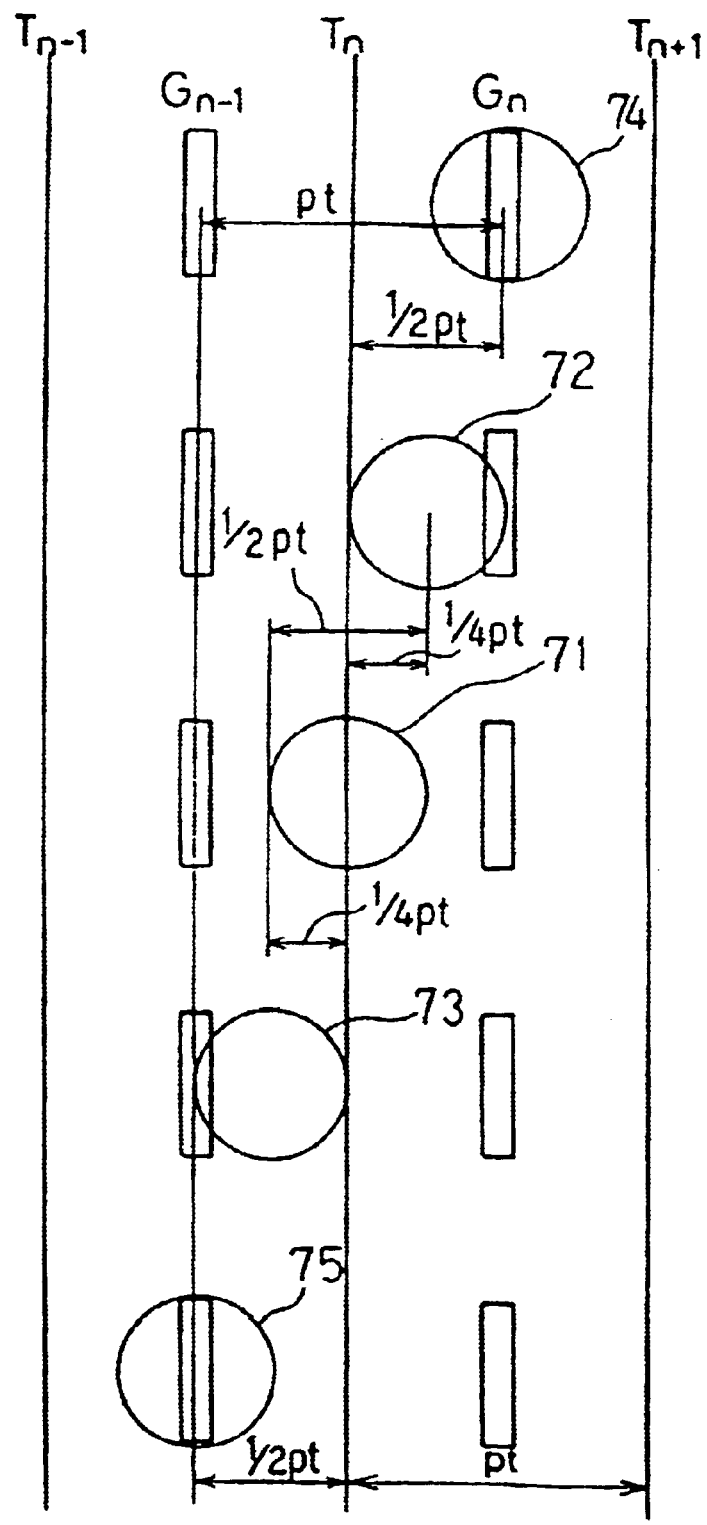
FIG. 13 is a diagram illustrating a magnetic recording apparatus and the relationship between guiding grooves of the magnetic recording medium and timing signals of the fourth embodiment of the present invention.

FIG. 13 illustrates beams focused on a magnetic recording medium 40 in the fourth embodiment. The beam 71 is a zeroth-order diffracted light of the diffraction grating 32, the beams 72, 73 are first-order diffracted lights of the diffraction grating 32, and the beams 74, 75 are second-order diffracted lights of the diffraction grating 32, respectively. The beams 71 to 75 are located so as to radiate different positions of a track, namely, the beams 71 and 72 and the beams 71 and 73 differ by pt/4 respectively, the beams 71 and 74 and the beams 71 and 75 differ by pt/2 respectively, the beams 72 and 73 differs by pt/2, and the beams 74 and 75 differs by pt.

Figure 14:
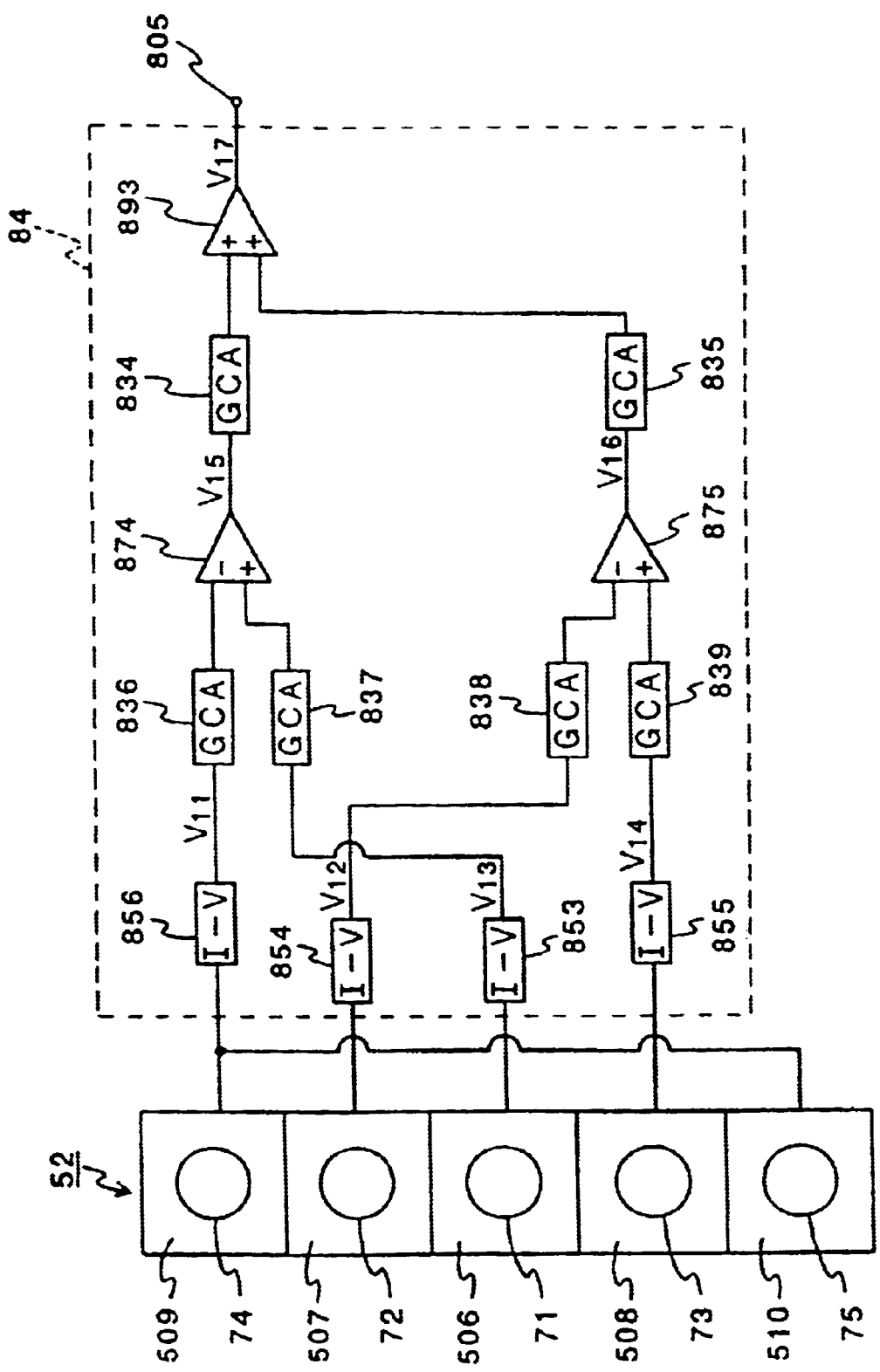
FIG. 14 is a diagram illustrating the configuration of the signal processing portion in the fourth embodiment.

The configuration of a photodetector 52 and a signal processing portion 84 are illustrated in FIG. 14. The photodetector 52 comprises five sensing portions 506 to 510 for sensing beams 71 to 75, respectively. Five electric signals outputted from the sensing portions 506 to 510 are inputted to the signal processing portion 84 to be converted to voltage signals by I-V converting portions 853 to 856, respectively. Signals outputted from the sensing portions 509 and 510 are added at the input side of the I-V converting portion 856. The signals v11 to v14 outputted from the I-V converting portions 853 to 856 are signals represented by the below mentioned formulae (14) to (17). In the formulae (14) to (17), A5 to A7 denote an amplitude, and B3 to B5 denote a DC component.

$$v11 = -A5 \cdot \sin(2\pi\, x/\mathrm{pt}) + B3 \quad (14)$$

$$v12 = -A6 \cdot \cos(2\pi\, x/\mathrm{pt}) + B4 \quad (15)$$

$$v13 = A7 \cdot \sin(2\pi\, x/\mathrm{pt}) + B5 \quad (16)$$

$$v14 = A6 \cdot \cos(2\pi\, x/\mathrm{pt}) + B4 \quad (17)$$

Signals v11 to v14 are inputted to changeable gain amplifying parts 836 to 839 respectively, and after being adjusted to a favorable amplitude, inputted to differential operation parts 874, 875 to conduct subtraction. The reason why the changeable gain amplifying portions 836 to 839 are arranged at the input side of the differential operation parts 874, 875 is the same as the reason why the changeable gain amplifying portions 836 to 839 are similarly arranged in the third embodiment.

Signals v15, v16 outputted from the differential operation parts 874, 875 are signals represented by the below mentioned formulae (18) and (19). In the formulae (18) and (19), A8 and A9 denote an amplitude.

$$v15 = A8 \cdot \sin(2\pi\, x/\mathrm{pt}) \quad (18)$$

$$\begin{aligned} v16 &= A9 \cdot \cos(2\pi\, x/\mathrm{pt}) \\ &= A9 \cdot \sin(2\pi\, x/\mathrm{pt} + \pi/2) \end{aligned} \quad (19)$$

Signals v15, v16 are sine waves out of phase by $\pi/2$. The signals v15, v16 outputted from the differential operation parts 874, 875 are inputted to the changeable gain amplifying portions 834, 835, respectively to be adjusted to a favorable amplitude, and inputted to the operation part 893. The operation part 893 conducts addition of inputted signals, and outputs a tracking error signal v17 to an output terminal 805. As in the first to third embodiments, the signal v17 can be a signal capable of setting optional phase and amplitude by adjusting the gain of the changeable gain amplifying portions 834. 835.

In general, a magnetic recording medium 40 has a continuous spiral or concentric track to be rotated by a driving motor as represented by a floppy disk. In the fourth embodiment, the phases of signals inputted to the differential operation parts 874, 875 are different by $\pi/2$ respectively as described with the formulae (14) to (17). Accordingly, even when the rotation center of the driving motor and the rotation center of the magnetic recording medium 40 are not exactly alligned in rotating the magnetic recording medium 40 thereby causing the decentering of the track, deterioration of the tracking error signals is smaller. That is, according to the fourth embodiment, a stable tracking servo operation can be conducted even when rotations of the magnetic recording medium are greatly decentered.

The signal processing portion can be realized through hardware by using an analog device such as an operational amplifier, however, it is also feasible to process through software after converting an analog signal to a digital signal, and thus the configuration of the signal processing portion does not cause particular limitations.

The operation parts 432 to 434 for adding two signals out of phase by $\pi/2$ can be replaced by differential operation parts depending upon the polarity of signals.

When deterioration of the dynamic range can be tolerated to some extent, the operation parts can comprise a switching device to output some of the inputted signals selectively. In this case, by providing a hysteresis characteristic in the switching timing, stable operation without oscillation can be realized.

Fifth Embodiment

Figure 15:
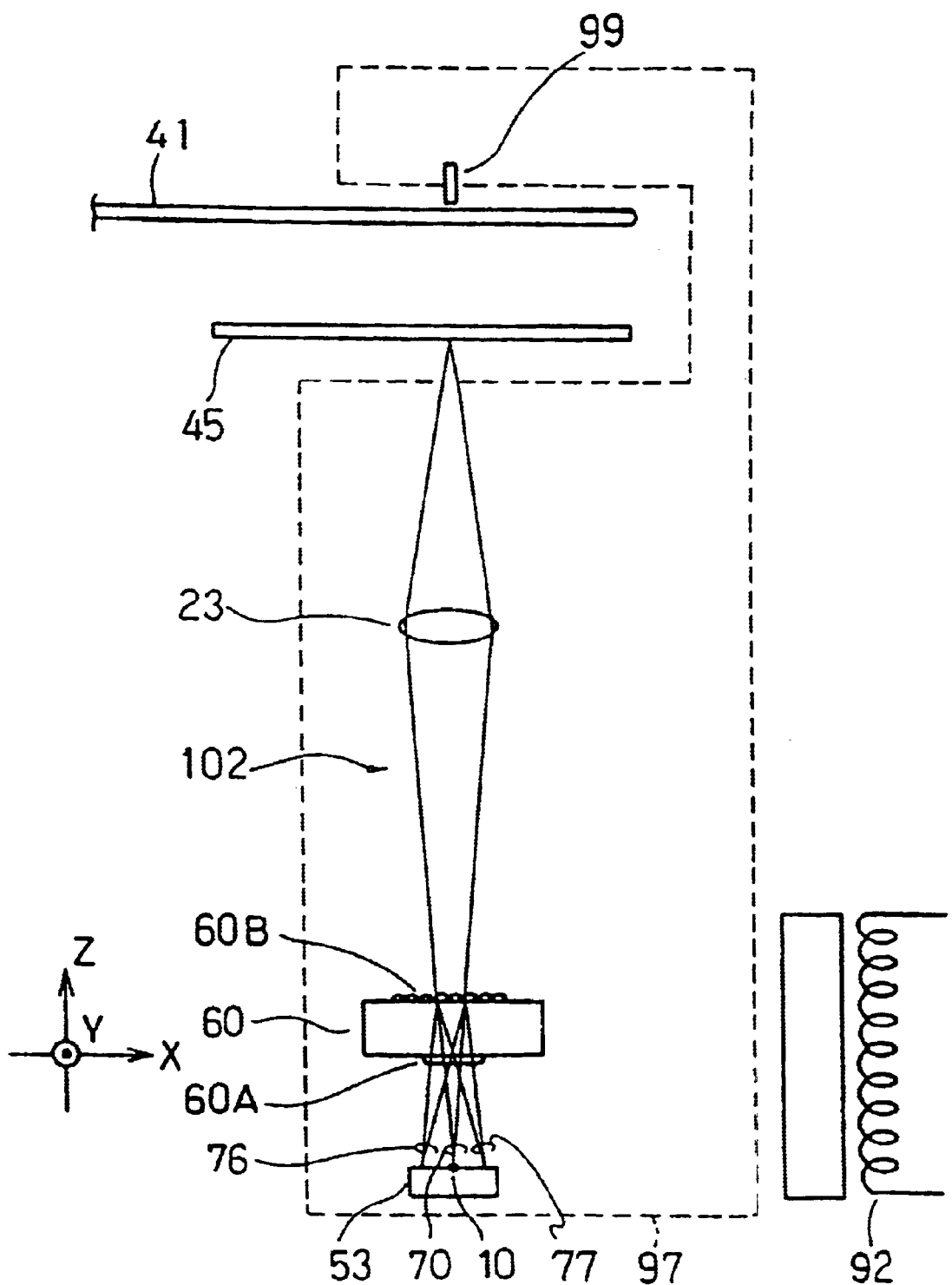
FIG. 15 is a diagram illustrating the configuration of a magnetic recording apparatus and a tracking error signal detection apparatus of the fifth embodiment of the present invention.

The fifth embodiment concerning a magnetic recording apparatus and the tracking error signal detection apparatus of the present invention will be explained with reference to FIGS. 15 to 18. FIG. 15 illustrates the configuration of a magnetic recording apparatus and the tracking error signal detection apparatus of the fifth embodiment.

In FIG. 15, a linearly polarized divergent beam 70 radiated from a semiconductor laser light source 10 enters the area 60A of a diffraction element 60 to become three beams, that is, zeroth-order and ±first-order diffraction lights. In the area 60B, a plurality of beams are further generated from the three beams generated in the area 60A. The grating pitch of the area 60B is designed so that only the zeroth-order diffraction light out of the diffraction lights generated in the area 60B enters the aperture of the object lens 23 in the optical path extending from the light source 10 to the object lens 23. The object lens 23 is a finite object lens to focus the beam 70 on the reflecting body 45.

Lattice patterns with a cycle pt of 10 $\mu$m are formed on the reflecting body 45. The cycle pt is identical to the cycle of the track on the magnetic recording medium 41. The beam reflected and diffracted by the reflecting body 45 enters the area 60B of the diffraction element 60 after passing through the objective lens 23 again. A plurality of diffracted lights are generated from the beam which entered the area 60B. Among the generated lights, ±first-order diffraction lights 76. 77 are sensed by the photodetector 53 to be converted to electric signals.

Figure 16A:
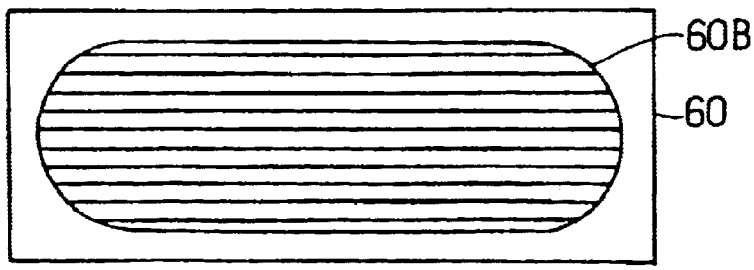
FIGS. 16A and 16B are diagrams illustrating patterns of the diffraction element in the fifth embodiment.
Figure 16B:
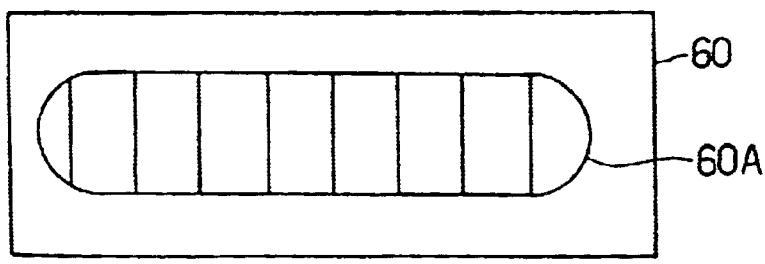
Figure 16C:
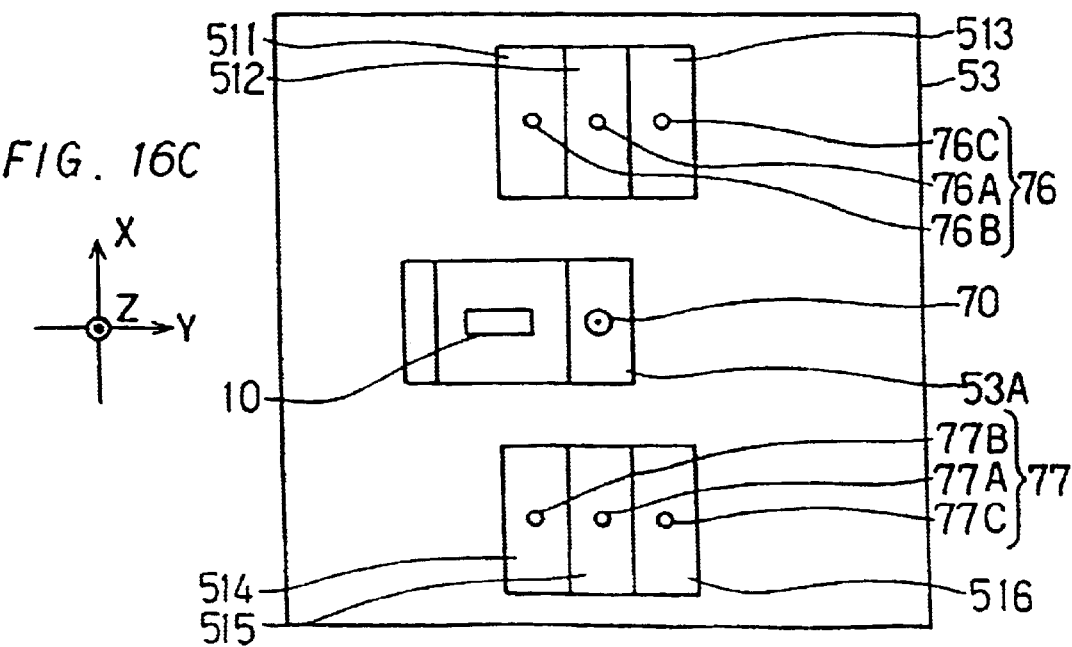
FIG. 16C is a diagram illustrating light beams on the photodetector and sensing portions.

FIG. 16A illustrates a pattern of the area 60B of the diffraction element 60. FIG. 16B illustrates a pattern of the area 60A of the diffraction element 60. FIG. 16C illustrates beams 76 to 77 on the photodetector 53 and sensing portions 511 to 516 formed on the photodetector 53. A grating with a 10 µm cycle is formed on the area 60A of the diffraction element 60. and a grating with a 3 µm cycle is formed on the area 60B of the diffraction element 60, respectively. Orientation of the grating formed on the area 60A and orientation of the grating formed on the area 60B are orthogonal to each other.

The light source 10 is arranged on the photodetector 53 comprising an etched silicon substrate. A light beam 70 radiated from the light source is reflected by a mirror 53A formed on the silicon substrate so that the optical path of the beam 70 becomes perpendicular to the plane in which the sensing portions 511 to 516 of the photodetector 53 are formed. Beams 76A, 77A are zeroth-order diffraction beams generated by the incidence to the area 60A of the diffraction element 60 of the beam 70 radiated from the light source, and beams 76B, 76C, 77B and 77C are ±first-order diffraction beams generated by the incidence to the area 60A of the diffraction element 60 of the beam 70. The beams 76A to 76C and the beams 77A to 77C are sensed at the sensing portions 511 to 516, respectively.

By inputting electric signals outputted from the photodetector 53 to, for example, the signal processing portion 82 as illustrated in FIG. 11 of the second embodiment, a tracking error signal can be generated. Specifically, this can be achieved by inputting signals outputted from the sensing portions 511 and 514 into the I-V converting portion 854, signals outputted from the sensing portions 512 and 515 into the I-V converting portion 853, and signals outputted from the sensing portions 513 and 516 into the I-V converting portion 855, respectively.

A tracking error signal v10 outputted on the terminal 803 of the signal processing portion 82 of FIG. 11 is inputted to the driving portion 92. The driving portion 92 adjust the relative position between the magnetic recording medium 41 and the base 97 including the tracking error signal detection optical system 102 and the magnetic head 99 for tracking the magnetic head 99 at a desired track.

FIGS. 17A to 17C illustrates the relationship between the aperture size and the focal length of the object lens 23. Wx, Wy denote the aperture size of the object lens 23 to the X axis orientation and to the Y axis orientation, respectively, fx, fy denote the length between the reflecting body 45 side of the object lens 23 and the focal point of the beam to the X axis orientation and to the Y axis orientation, respectively. Here Wx=Wy=2 mm, fx=12 mm, and fy=∞ that is, the object lens 23 has the same aperture size in the X axis orientation and in the Y axis orientation, and different focal lengths in the X axis orientation and in the Y axis orientation. This lens is a kind of a cylindrical lens. X, Y, Z axes orientations correspond with the X, Y, Z axes orientations described in FIG. 15, That is, X axis orientation is the orientation orthogonal Do the track, Y axis orientation is the orientation parallel to the track, and Z axis orientation is the orientation orthogonal to the X and Y axes orientations.

Figure 18:
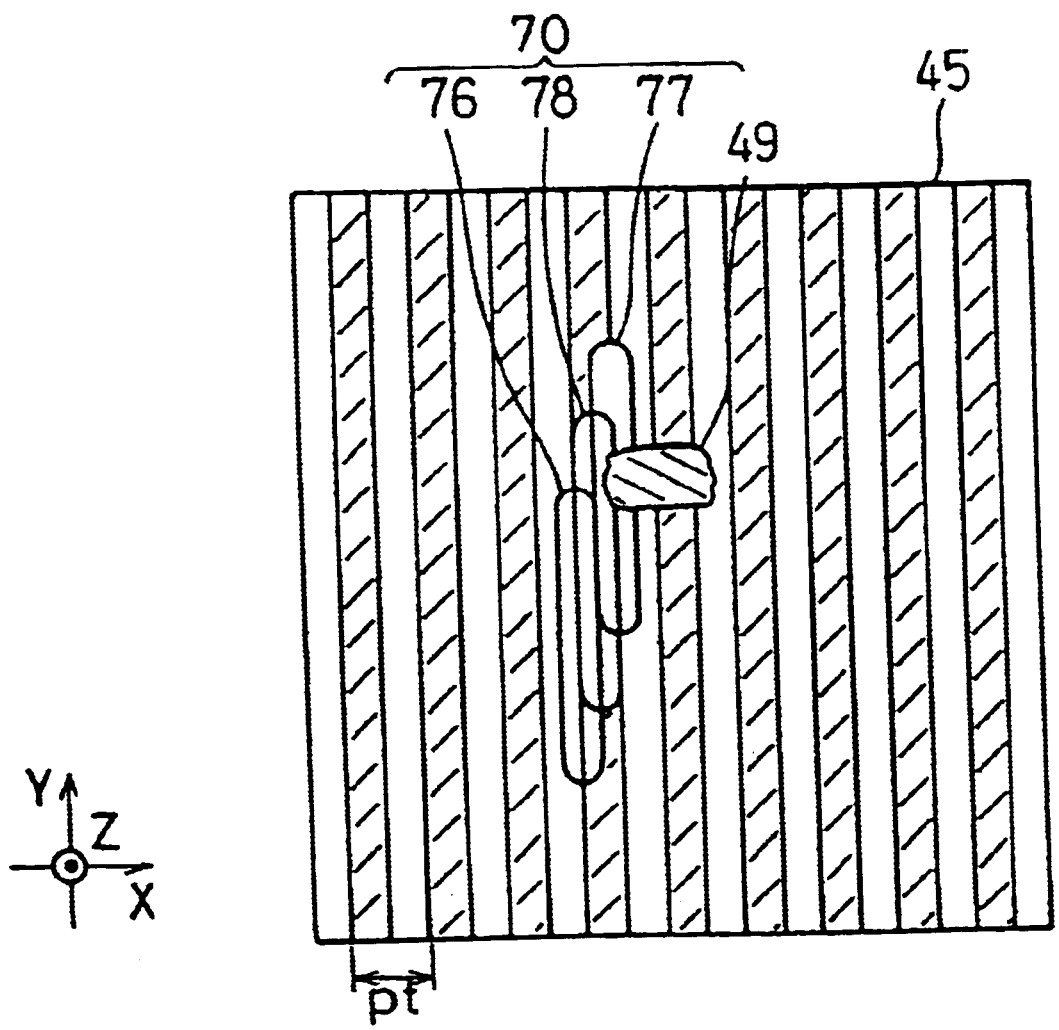
FIG. 18 is a diagram illustrating the relationship between a reflecting body and beams in the fifth embodiment.

FIG. 18 illustrates the relationship between the reflecting body 45 and the beam focused by the object lens 23. The beam 70 comprises three beams 76 to 78, which are zero-order and first-order diffraction lights generated by the incidence of the beam 70 radiated from the light source 10 into the area 60A of the diffraction element 60. The beam 70 focused on the reflecting body 45 becomes strip-like having the X axis orientation size of about 5 µm and the Y axis orientation size of about 2 µm. In the tracking error signal detection apparatus of the fifth embodiment, even when the reflecting ratio of the reflecting body 45 is partially changed due to a dust 49 or a flaw, since the size of the beams 76 to 78 in the Y axis orientation is 2 mm and is significantly large, the partial reflecting ratio change can be averaged to reduce the intensity variation of the three beams 76 to 78. Accordingly, the offset generated in a tracking error signal becomes small.

Furthermore, since the respective length between the center of the beams 76 to 78 are set to be about 100 µm, most of the area of the beams overlap to each other. Therefore, even when a partial reflection ratio change occurs in the reflecting body 45, the change is corrected by the three beams 76 to 78 and thus the intensity variance of the three beams 76 to 78 reflected by the reflecting body 45 becomes small. If the intensity of the three beams 76 to 78 is varied, an offset occurs in the tracking error signal to cause an off track. On the other hand, when the intensity of the three beams 76 to 78 change but are not varied, although the servo gain decreases, an offset does not occur and thus the magnetic head can be controlled on a desired track.

Sixth Embodiment

Figure 19:
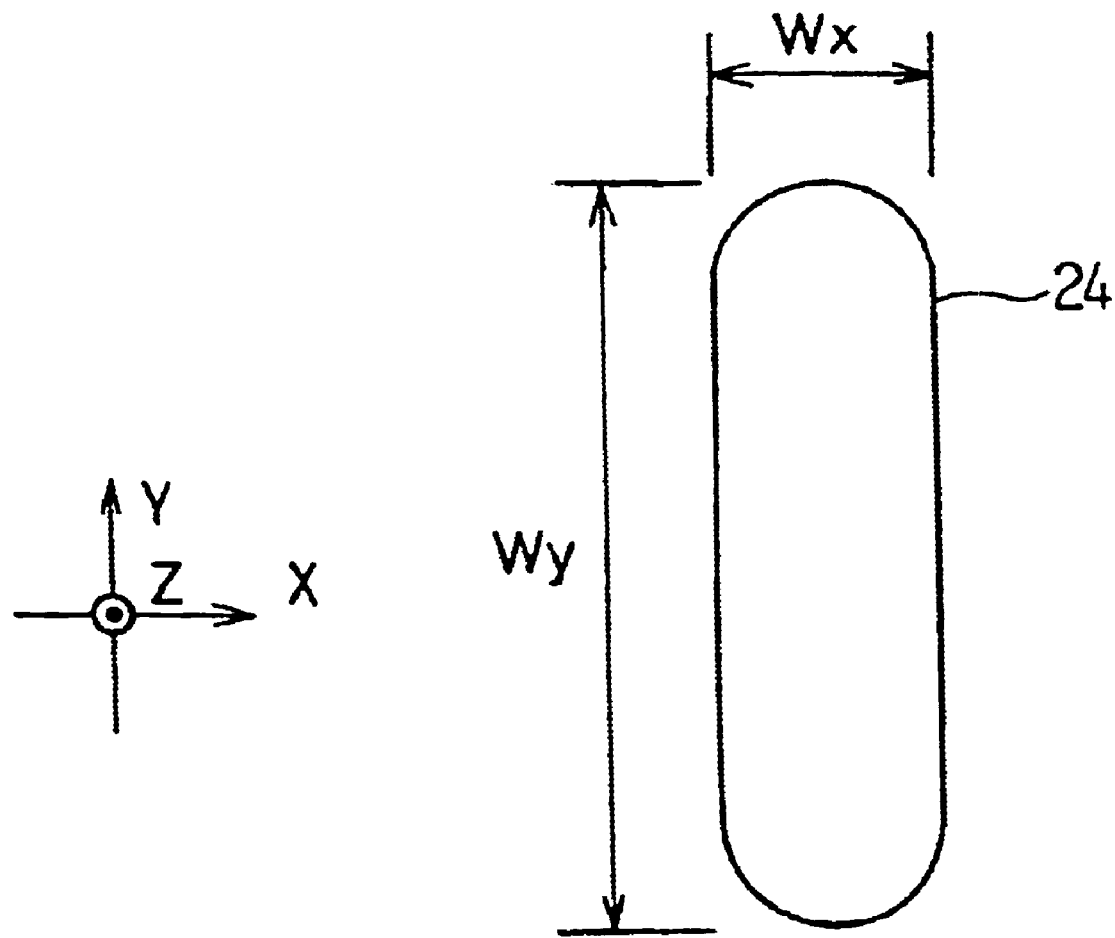
FIG. 19 is a diagram illustrating the configuration of an object lens of a tracking error signal detection apparatus of the sixth embodiment of the present invention.

The sixth embodiment concerning a magnetic recording apparatus and the tracking error signal detection apparatus of the present invention will be explained with reference to FIG. 19. FIG. 19 illustrates the configuration of an object lens 24 of the sixth embodiment. The object lens 24 is used in the sixth embodiment in place of the object lens 23 in the fifth embodiment. Since other configurations are the same, details are not explained herein.

As illustrated in FIG. 19, the Y axis orientation aperture Wy of the object lens 24 is larger than the X axis orientation aperture Wx. Here Wx=2 mm, and Wy=5 mm. In the X axis orientation, the relationship between the track pitch pt of the reflecting body 45 and the aperture of the object lens needs to be maintained in a certain range. However, as to the Y axis orientation, it can be optionally set as long as signals from guiding grooves can be detected. The focal lengths of the object lens 24 are fx=12 mm, fy=∞ as in the object lens 23 of the fifth embodiment. The size of the beam 70 on the reflecting body 45 when the object lens 24 is used can further be larger in the Y axis orientation compared with the case of using the object lens 23, namely, 5 µm in the X axis orientation and 5 mm in the Y axis orientation.

Furthermore, concerning the dislocation of the angle formed by the reflecting body 45 and the beam 70, the greater the aperture of the object lens 24 is, the smaller the ratio of the beam 70 reflected by the reflecting body 45 to that outside the aperture of the object lens 24 becomes. That is, if the aperture size triples, the tolerable angle dislocation triples accordingly. In the sixth embodiment, by having a larger aperture of the object lens 24 in the Y axis orientation, influence of the angle dislocation between the reflecting body 45 and the beam 70 can be tolerated in the Y axis orientation without adjustment. Therefore, in the assembly of a magnetic recording apparatus using a tracking error signal detection apparatus of the sixth embodiment, angle dislocation needs to be adjusted only to the X axis orientation, and thus the adjustment operation can be conducted in a shorter time period. Accordingly, the magnetic recording apparatus of the sixth embodiment enables easy production at a lower cost.

In the magnetic recording apparatus of the present invention, a tracking error signal can be obtained even when guiding grooves for enabling the detection of a tracking error signal are not formed on the magnetic recording medium. Hence, the tracking operation can be conducted on a magnetic recording medium having a track pitch of 188 μm called 2 HD, which is widely used.

Seventh Embodiment

Figure 20:
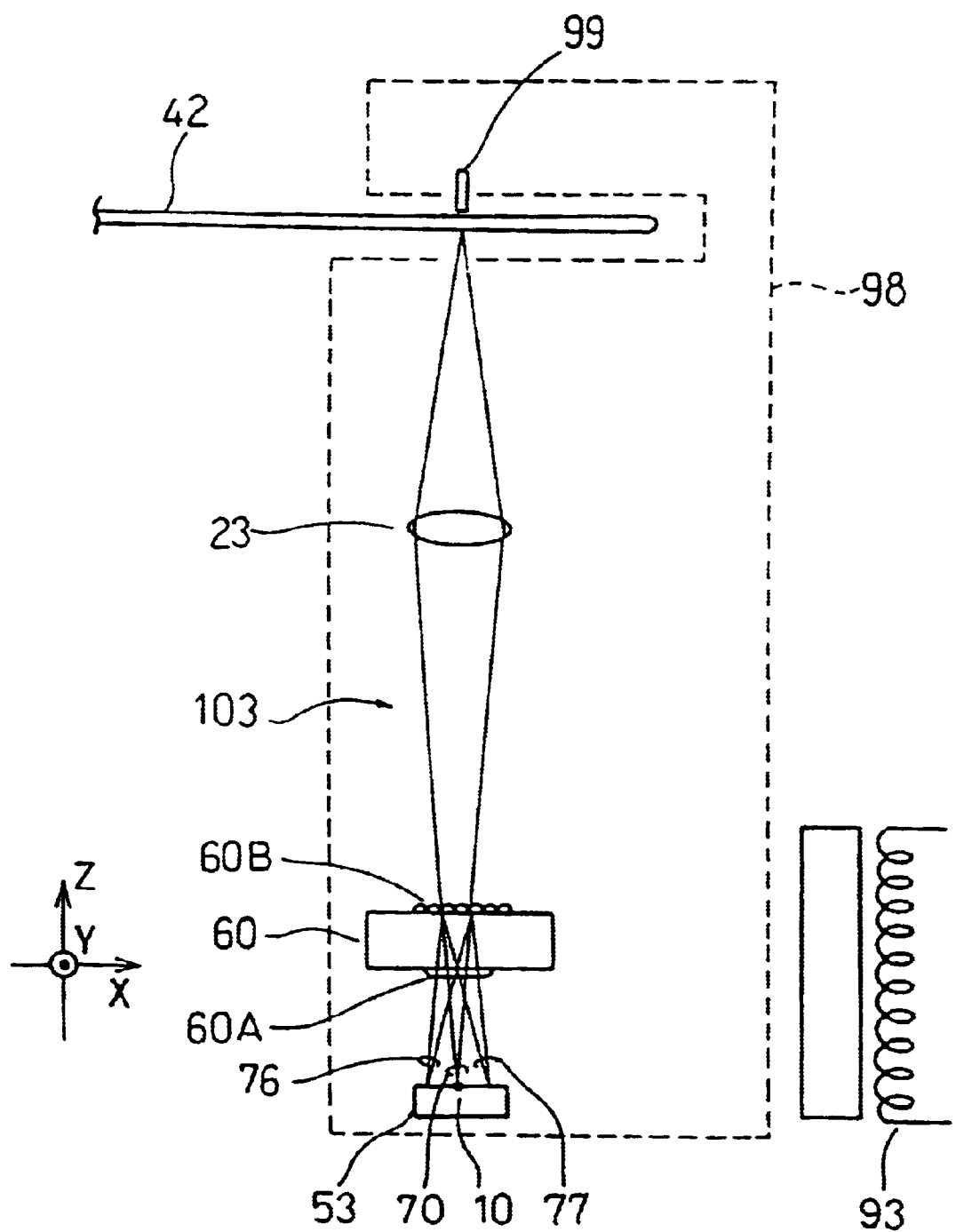
FIG. 20 is a diagram illustrating the configuration of a magnetic recording apparatus and a tracking error signal detection apparatus of the seventh embodiment of the present invention.

The seventh embodiment concerning a magnetic recording apparatus and the tracking error signal detection apparatus of the present invention will be explained with reference to FIG. 20. FIG. 20 illustrates the configuration of a magnetic recording apparatus and the tracking error signal detection apparatus of the seventh embodiment. The configuration of the magnetic recording apparatus and the tracking error signal detection method of the seventh embodiment are the same as in the fifth embodiment except that guiding grooves for enabling the optical detection of a tracking error signal are formed on a magnetic recording medium 42 in the seventh embodiment.

The magnetic recording medium 42 is equivalent to the compound of the magnetic recording medium 41 and the reflecting body 45 illustrated in FIG. 15. The optical system to detect tracking error signals and the magnetic head 99 are installed on a base 98. Tracking operation is conducted by inputting a tracking error signal into a driving portion 93.

Eighth Embodiment

Figure 21:
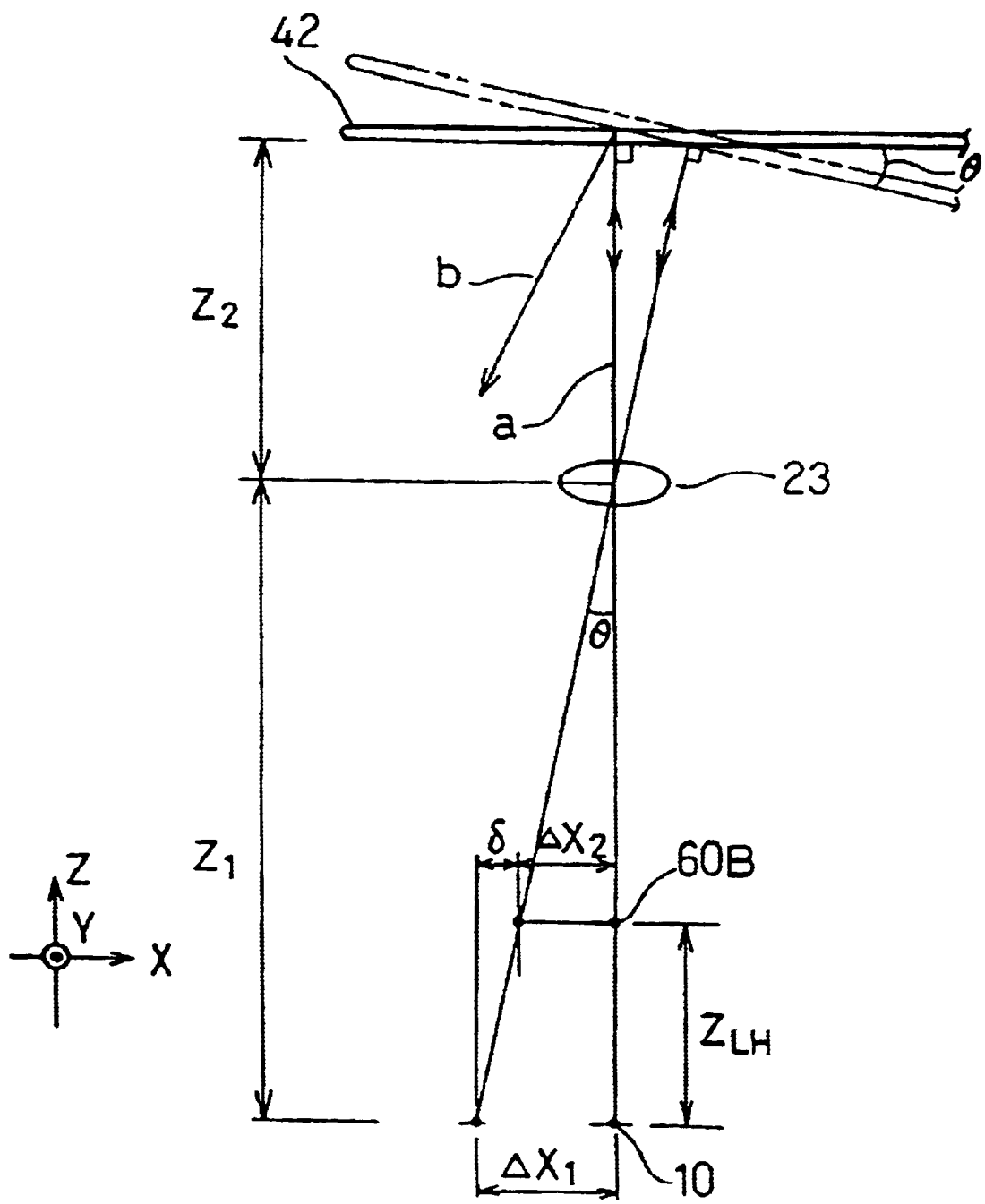
FIG. 21 is a diagram illustrating a magnetic recording apparatus, and a relationship among a light source, an object lens, and a magnetic recording medium, and a principle of the adjusting method of a magnetic recording medium in the eighth embodiment of the present invention.

The eighth embodiment concerning a magnetic recording apparatus and an adjusting method thereof of the present invention will be explained with reference to FIGS. 21 and 22. FIG. 21 illustrates the relationship among the light source 10, the object lens 23 and the magnetic recording medium 42. The configuration of the optical system to detect the tracking error signals is the same as the configuration of the seventh embodiment illustrated in FIG. 20.

In FIG. 21, when the beam 70 focused by the object lens 23 is orthogonal to the magnetic recording medium 42, the beam reflected by the magnetic recording medium 42 returns within the aperture of the object lens 23 as described by "a", the amount of light of the beam guided to the photodetector 53 does not decrease. However, if the angle θ is formed in fixing the magnetic recording medium 42, the beam is reflected by the magnetic recording medium 42 outside the aperture of the object lens as described by "b". In general, in the assembly of a magnetic recording apparatus, a system to adjust the angle dislocation θ in fixing the magnetic recording medium 42 is complicated and expensive.

In the adjusting method of the eighth embodiment, the angle dislocation of the magnetic recording medium 42 is not adjusted, but is compensated by adjusting the position of the light source 10 to the X axis orientation and to the Y axis orientation, which are orthogonal to the optical axis of the object lens 23. When the amount of movement of the light source $10\Delta X1=Z1 \cdot \tan \theta$ is satisfied (Z1 is the length from the light source 10 to the object lens 23), the vignetting in the object lens 23 caused by the angle dislocation θ in fixing the magnetic recording medium 42 can be completely compensated. For example, with the numerical aperture NA=0.017, angle dislocation θ=0.97 degree of the object lens 23 at the magnetic recording medium 42 side, a beam reflected by the magnetic recording medium 42 does not enter the aperture of the object lens 23 at all. On the other hand, for example, with Z1=200 mm and ΔX1=340 μm, a beam reflected by the magnetic recording medium 42 entirely enters the aperture of the object lens 23. Since the position adjustment of the light source 10 can be conducted as in the case of fixing the photodetector of an optical pickup head apparatus to reproduce information on an optical recording medium, details are not explained herein. Therefore, a method of fixing the light source 10 while adjusting in the X axis orientation and the Y axis orientation can be realized easily at a low cost.

As illustrated in FIG. 20, a diffraction element 60 is used as the beam splitting means to guide a beam 70 reflected by the magnetic recording medium 42, by forming the light source 10 and the diffraction element 60 integrally, a tracking error signal can be detected with further stability.

With the premise that ZLH is the length from the light source 10 to the area 60B of the diffraction element 60 and Z2 is the length from the object lens 23 to the magnetic recording medium 42, the radius of the object lens 23 projected on the area 60B can be provided as RLH=Z2 ZLH·NA/Z1. With Z1=20 mm, Z2=15 mm, ZLH=3 mm and NA=0.017, RLH=38 μm. When the angle dislocation θ is 0.97 degree, the position of the light source 10ΔX1 is moved by 340 μm. In this case, the length between the beam position passing through the area 60B and the center of the proper diffraction element 60 is provided as ΔX2=ΔX1·(Z1−ZLH)/Z1, and is 289 μm. As apparent from the comparison between RLH and ΔX2, by conducting position adjustment of the light source 10 to the X axis orientation and the Y axis orientation, the area 60B needs to be much greater than in the case of not conducting the adjustment.

However, by enlarging the size of the area 60B, the ±first-order diffraction lights generated by the area 60B on the way from the light source 10 toward the object lens 23 enter the aperture of the object lens 23 to become a noise with respect to a tracking error signal. It is possible to avoid the incidence of the ±first-order diffraction lights from the area 60B to the aperture of the object lens 23 by shortening the pitch of the grating pattern of the area 60B. In this case, however, the area of the photodetector 53 needs to be enlarged, and thus the magnetic recording apparatus becomes expensive.

In the case of forming the light source 10 and the diffraction element 60 integrally so that the diffraction element 60 moves according to the movement of the light source 10, the length between the beam passing through the area 60B and the center of the proper diffraction element can be provided as δ=ΔX1·ZLH/Z1, and is 51 μm in the above mentioned conditions. As apparent from the comparison between δ and ΔX2, the size of the area 60B can be further smaller by forming the light source 10 and the diffraction element 60 integrally to prevent the incidence of the ±first-order diffraction lights generated in the area 60B into the object lens, and thus a greater angle dislocation θ of the magnetic recording medium 42 can be tolerated to a greater angle.

Figure 22:
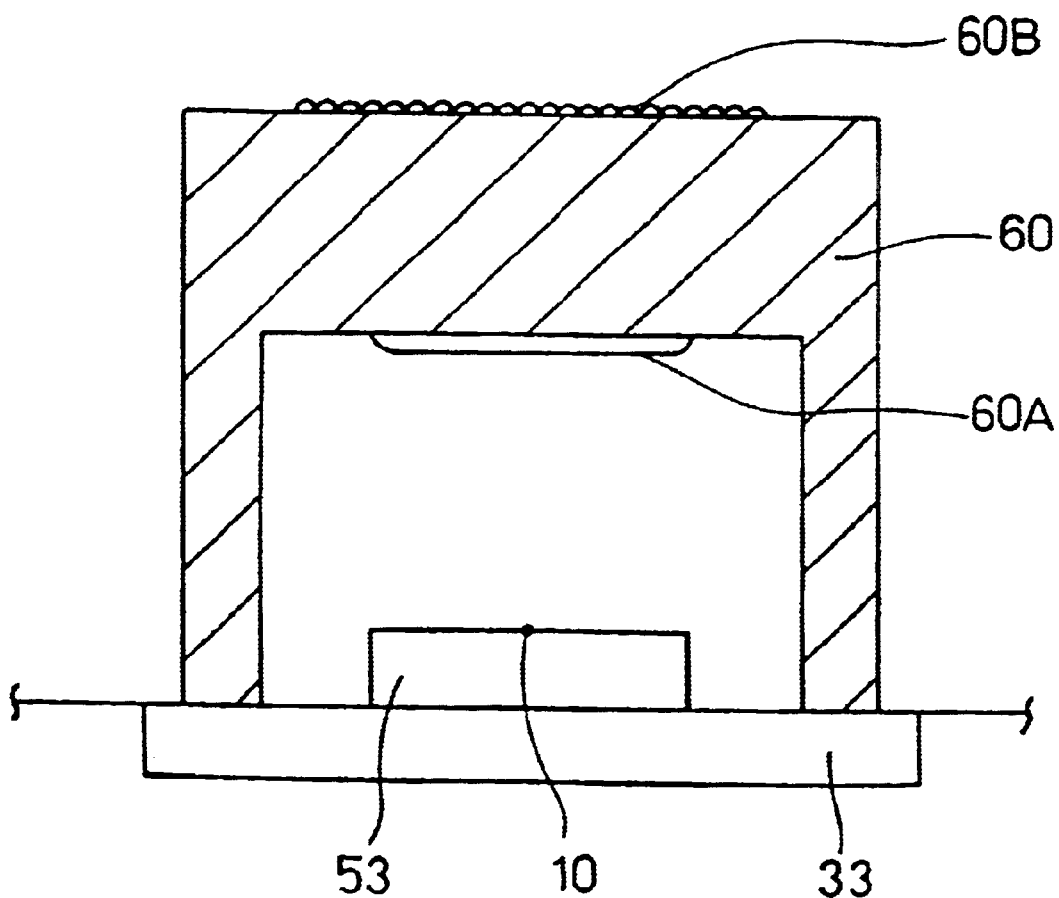
FIG. 22 is a diagram illustrating the configuration of a light source located on an photodetector and a diffraction element in the eighth embodiment.

FIG. 22 illustrates the configuration where a light source 10 and a diffraction element 60 are formed integrally on a photodetector 53. The photodetector 53 is arranged at the bottom of a package 33 and the diffraction element 60 having a form of a case to protect the photodetector 53 is arranged on the package. The package 33 and the diffraction element 60 is firmly bonded with an adherent. The position adjustment of the light source to the X axis orientation and the Y axis orientation is conducted by moving the package 33 to the X axis orientation and the Y axis orientation. In this case, since the diffraction element 60 is bonded and fixed to the package 33, the diffraction element 60 moves according to the movement of the package 33.

Ninth Embodiment

Figure 23A:
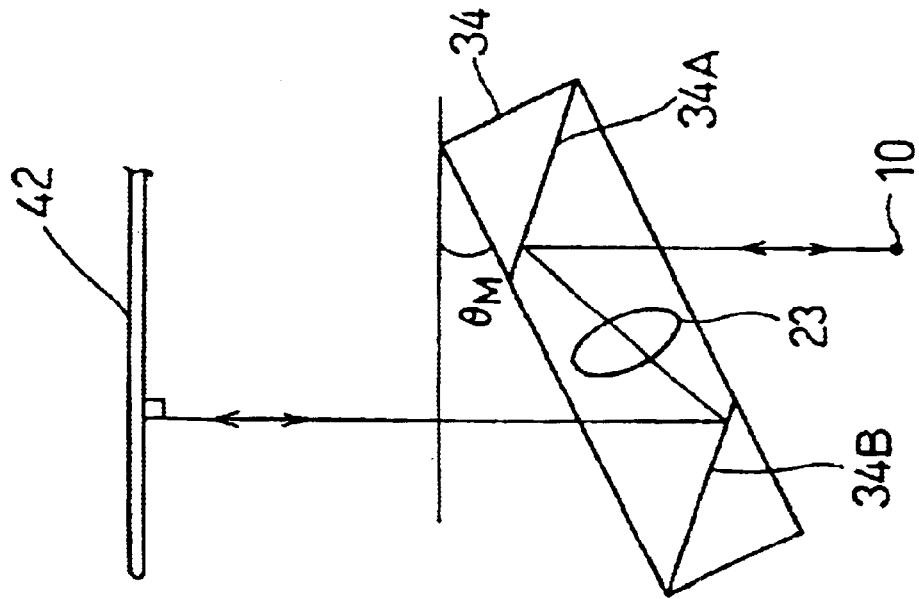
FIGS. 23A, 23B are diagrams illustrating a magnetic recording apparatus and the relationship among a light source, a magnetic recording medium and an optical system in the adjusting means in the ninth embodiment of the present invention, where 23A describes the case when a reflecting plane is arranged in the correct angle, and 23B describes the case when a mirror integrally forming a reflecting plane has an angle dislocation.
Figure 23B:
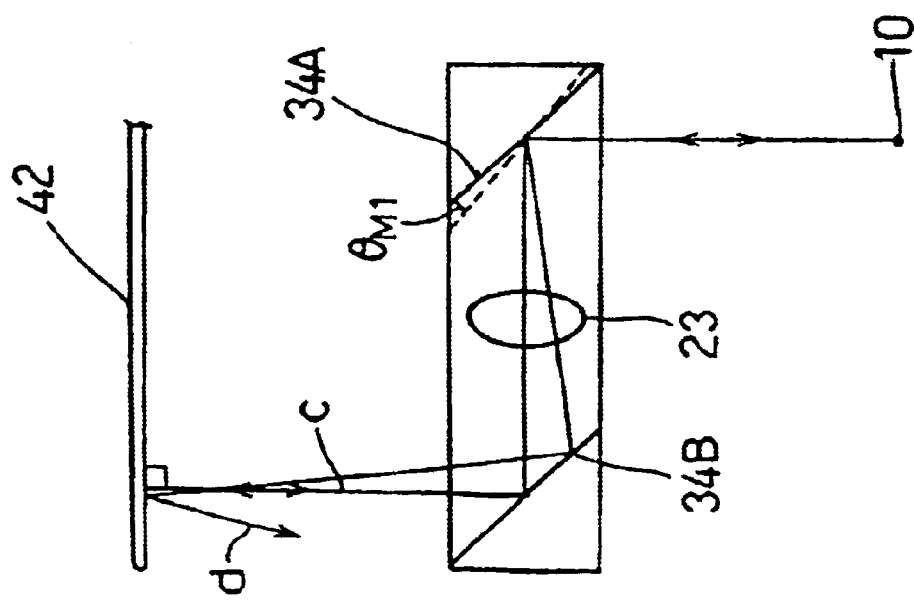

The ninth embodiment concerning a magnetic recording apparatus and an adjusting method thereof of the present invention will be explained with reference to FIGS. 23A and 23B. FIGS. 23A and 23B illustrate the relationship between the light source 10 and the magnetic recording medium 42, respectively. The basic configuration of the magnetic recording apparatus of the ninth embodiment is the same as the configuration of the seventh embodiment illustrated in FIG. 20 except that the ninth embodiment has two reflecting planes 34A, 34B for deflecting the optical path in the front and back of the object lens 23 so as to reduce the bulk of the optical system.

As described in FIG. 23A, when the reflecting planes 34A, 34B are located with the regular angle, a light beam reflected by the magnetic recording medium 42 enters the aperture of the object lens as indicated by "c". On the other hand, when the reflecting plane 34A has an angle dislocation θM1, a light beam reflected by the magnetic recording medium 42 does not enter the aperture of the object lens 23 as indicated by "d".

When the reflecting planes 34A and 34B are installed to the base 98 as individual parts, respective angle displacements of the reflecting planes 34A and 34B may prevent the incidence of a light beam reflected by the magnetic recording medium 42 into the aperture of the object lens 23. In the installation of the reflecting planes 34A and 34B individually to the base 98, due to various factors such as unevenness of the thickness of the adhesive applied for bonding, the processing accuracy of the base, angle displacements of the reflecting planes 34A and 34B exist to a degree which cannot be neglected.

FIG. 23B illustrates the case when a mirror 34 having the reflecting planes 34A and 34B integrally formed has an angle displacement θM. Examples of a mirror 34 include a plastic block molded to have a triangle section with the reflecting planes 34A. 34B formed by plating the surface with a metal. The relative angle accuracy between the reflecting planes 34A, 34B depends on the accuracy of the mold used for forming the mirror 34. Therefore, by using a mold with a high accuracy, mass production of a mirror 34 with little relative angle displacement between two reflecting planes 34A, 34B can be achieved.

In the case of using the mirror 34, the angle displacement of the reflecting plane 34A can be compensated by the angle displacement of the reflecting plane 34B, and thus the angle formed by the magnetic recording medium 42 and the light beam is always constant without dependency on the angle displacement θM caused in the installation of the mirror. Accordingly, the light beam reflected by the magnetic recording medium 42 enters the aperture of the object lens 23. As a consequence, according to this embodiment, downsizing and easy assembly of the magnetic recording apparatus can be realized.

Furthermore, by arranging the object lens 23 on the mirror 34 compared to the case of the object lens 23 not arranged on the mirror 34, the range of the allowance of the installation angle error of the mirror 34 will be wider to further facilitate the assembly.

Tenth Embodiment

Figure 24A:
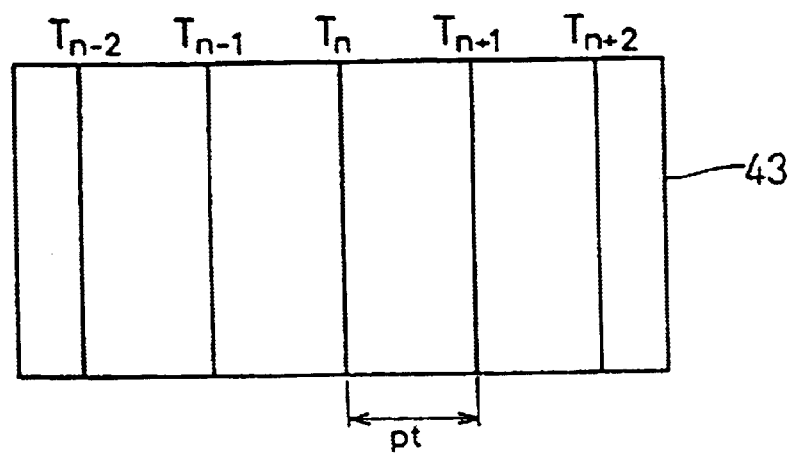
FIG. 24A is a diagram illustrating the configuration of a magnetic recording apparatus, and 24B is a diagram illustrating the configuration of a reflecting body of the tenth embodiment of the present invention.
Figure 24B:
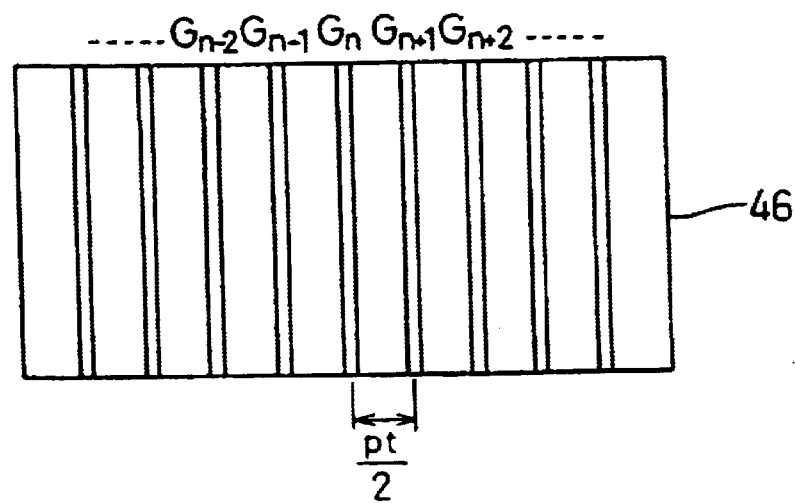

The tenth embodiment concerning a magnetic recording medium and a magnetic recording apparatus using thereof of the present invention will be explained with reference to FIGS. 24A and 24B. FIGS. 24A and 24B illustrate the configuration of a magnetic recording medium 43 and a reflecting body 46. The basic configuration of the optical system of the magnetic recording apparatus of the tenth embodiment is the same as the configuration of the fifth embodiment illustrated in FIG. 15 except that the tenth embodiment has a magnetic recording medium 43 and a reflecting body 46 instead of a magnetic recording medium 41 and a reflecting body 45 indicated in FIG. 15.

As illustrated in FIGS. 24A and 24B, the pitch of guiding grooves of the reflecting body 46 is pt/2 whereas the track pitch on the magnetic recording medium 43 is pt. The numerical aperture NA of the object lens 23 can be larger in inverse proportion to the pitch of guiding grooves. When the track pitch pt is 50 μm, the optimum value of the numerical aperture NA of the object lens 23 in the fifth embodiment is 0.017. Accordingly, since the guiding groove pitch is pt/2, the optimum value of the numerical aperture NA of the object lens 23 when the reflecting body 46 of the tenth embodiment is used becomes 0.034.

The angle displacement caused by fixing the reflecting body 46 in assembling the magnetic recording apparatus may prevent the incidence of the light beam reflected by the reflecting body 46 into the aperture of the object lens 23. However, in the magnetic recording apparatus of the tenth embodiment, since the numerical aperture of the object lens 23 can be optionally set by changing the pitch of guiding grooves on the reflecting body 46, effect of the angle displacement caused by fixing the reflecting body 46 can be avoided by enlarging the numerical aperture NA of the object lens 23. That is, a magnetic recording apparatus without the need of the adjustment in assembling can be provided at a low cost.

Eleventh Embodiment

Figure 25A:
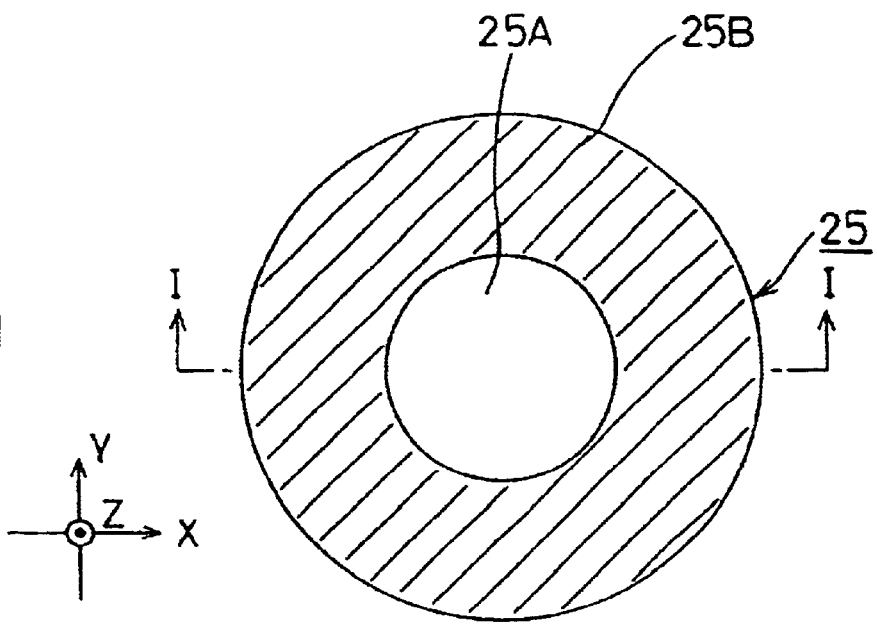
FIG. 25A is a plan view illustrating the configuration of a magnetic recording apparatus and an object lens of the tracking error signal detection apparatus.
Figure 25B:
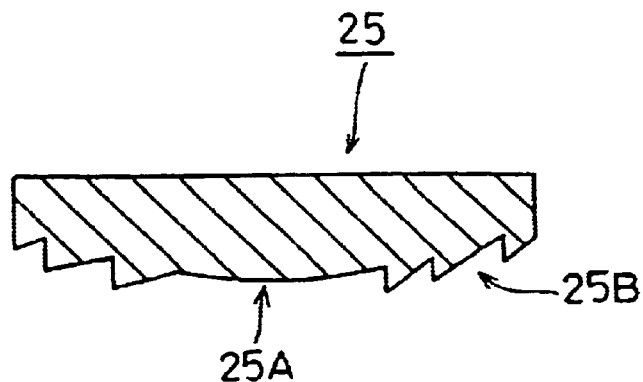
FIG. 25B is a side sectional view thereof of the eleventh embodiment of the present invention.
Figure 26:
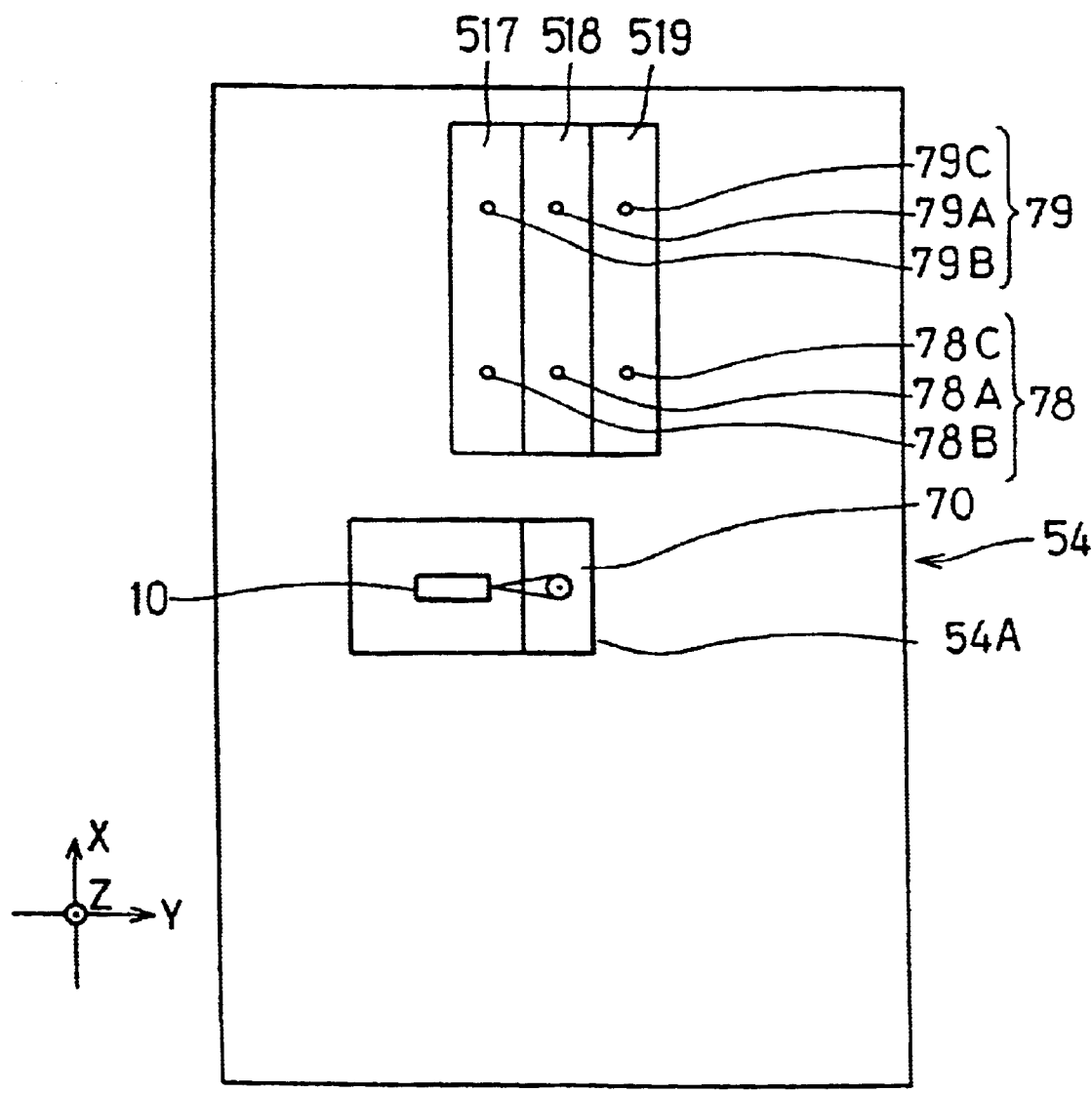
FIG. 26 is a diagram illustrating the relationship between sensing portions of an photodetector and diffracted beams of the eleventh embodiment of the present invention.

The eleventh embodiment concerning a magnetic recording medium and the tracking error signal detection apparatus of the present invention will be explained with reference to FIGS. 25A, 25B and 26. FIG. 25A is a plan view illustrating the configuration of an object lens 25 of the magnetic recording apparatus and the tracking error signal detection apparatus of the eleventh embodiment. FIG. 25B is a cross sectional view of thereof. FIG. 26 illustrates the relationship between the photodetector 54 and the light beams 78, 79. The basic configuration of the optical system of the magnetic recording apparatus and the tracking error signal detection apparatus of the eleventh embodiment is the same as the configuration of the fifth embodiment illustrated in FIG. 15 except that the eleventh embodiment has the object lens 25 and the photodetector 54 instead of the object lens 23 and the photodetector 53 of the fifth embodiment.

As illustrated in FIGS. 25A and 25B, the object lens 25 comprises a simple lens as the area 25A and a lens having a diffraction grating formed thereon as the area 25B. The numerical aperture NA of the area 25A is 0.017 and the numerical aperture of the area 25B is 0.034. As described in FIG. 25B, the diffraction grating of the area 25B has a sawtooth-like sectional form to prevent the generation of unnecessary diffraction lights as a noise in a tracking error signal. Further, the depth of the grating is designed so that a zeroth-order diffraction light generated by the area 25B becomes 0. Moreover, the apparatus is designed so that the numerical aperture of the area 25B does not become unnecessarily large with respect to the light beam 70 focused on the reflecting body.

With the premise that the object lens 23 in FIG. 15 is substituted by the object lens 25, when there is no angle displacement in fixing the reflecting body 45, the light beam reflected by the reflecting body 45 returns to the area 25A. When there is an angle displacement, the light beam reflected by the reflecting body 45 according to the displaced angle enters the area 25B. The light beam entering the area 25B becomes a +first-order diffraction light and enters the area 60B of the diffraction element 60.

As illustrated in FIG. 26, a photodetector 54 comprises three sensing portions 517 to 519 for sensing diffraction lights 78, 79 from the area 60B of the diffraction element 60. The beam 78 is a diffraction light generated by a beam passing through the area 25A of the object lens, and the beam 79 is a diffraction light generated by a beam passing through the area 25B of the object lens. The beams 78, 79 comprise three beams 78A to 78C, and 79A to 79C, respectively. These are zero-order diffraction lights and ±first-order diffraction lights generated in the area 60A of the diffraction element 60 in the optical path extending from the light source 10 to the reflecting body 45. Like the photodetector 53, on the photodetector 54 is the light source 10. The light beam 70 radiated from the light source 10 is reflected by the mirror 54A and deflected to the orientation perpendicular to the plane including the sensing portions 517 to 519 of the photodetector.

According to the eleventh embodiment, even when a light beam reflected by the reflecting body 45 cannot enter the aperture of the area 25A of the object lens 25 due to the angle displacement caused in fixing the reflecting body 45, the light beam can be guided to the photodetector 54 after entering the area 25B and being diffracted. Therefore, vignetting of a beam at the object lens 25 does not occur at all. Accordingly, The effect of the angle displacement caused in fixing the reflecting body 45 can be avoided. That is, a magnetic recording apparatus without the need of the adjustment in assembling can be provided at a low cost.

Twelfth Embodiment

Figure 27:
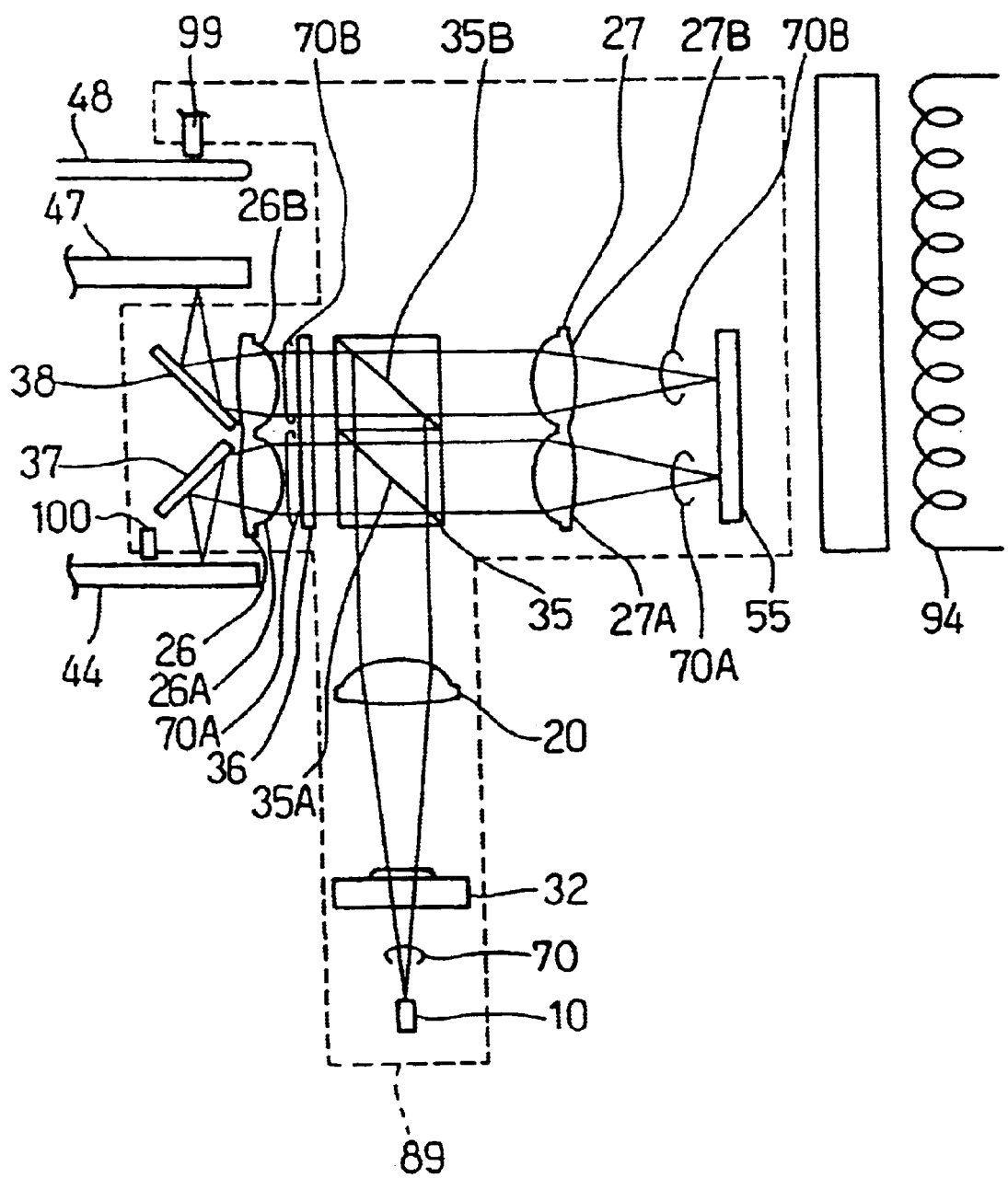
FIG. 27 is a diagram illustrating the configuration of a magnetic recording apparatus and the tracking error signal detection apparatus in the twelfth embodiment of the present invention.

The twelfth embodiment concerning a magnetic recording medium and the tracking error signal detection apparatus of the present invention will be explained with reference to FIGS. 27 to 29. FIG. 27 illustrates the configuration of a magnetic recording apparatus and the tracking error signal detection apparatus of the twelfth embodiment.

In FIG. 27, the linearly polarized divergent beam 70 radiated from the semiconductor laser light source 10 enters the diffraction grating 32. The incident light is diffracted by the diffraction grating 32 to become three beams. After being converted to parallel light beams by the collimator 20 respectively, the three beams generated by the diffraction grating 32 enter the polarizing beam splitter 35. A light beam entered the area 35A of the polarizing beam splitter 35 is further splitted to two beams 70A, 70B. The beam 70A is a light beam reflected by the area 35A, and the beam 70B is a light beam reflected by the area 35B after passing through the area 35A. The beams 70A, 70B are converted to circularly polarizated beams by passing through the ¼ wavelength plate 36 and collected by the areas 26A, 26B of the object lens 26, respectively. The collected beams 70A, 70B are reflected by the mirrors 37, 38, respectively to deflect the optical path and are focused on the magnetic recording medium 44 and the reflecting body 47. By the use of the mirrors 37, 38, the beams 70A, 70B can be guided onto the magnetic recording medium 44 and the reflecting body 47 respectively by deflecting the optical path.

Figure 28A:
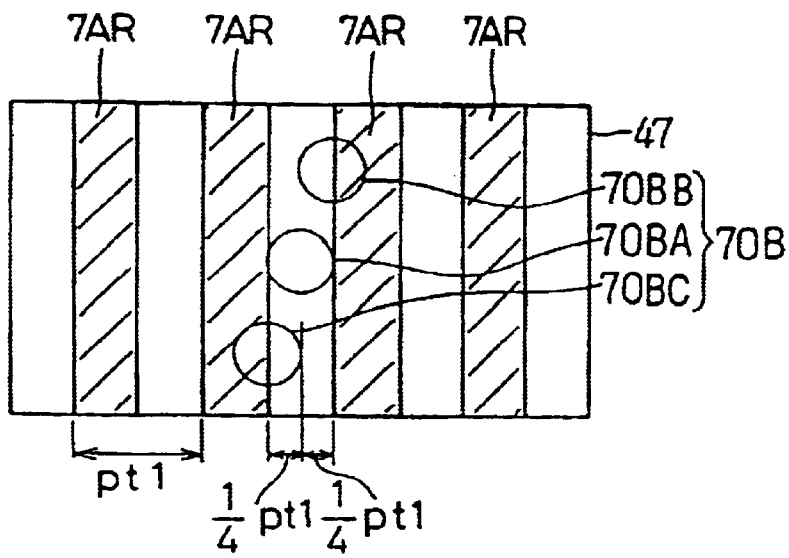
FIG. 28A is a diagram illustrating the reflecting plane of a reflecting body.
Figure 28B:
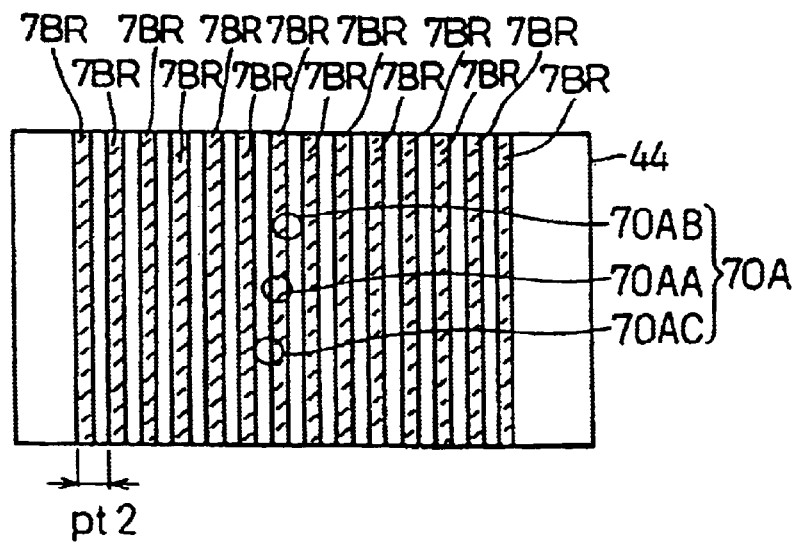
FIG. 28B is a diagram illustrating the reflecting plane of the magnetic recording medium in the twelfth embodiment of the present invention.

FIG. 28A illustrates the reflecting plane of the reflecting body 47, and FIG. 28B illustrates the reflecting plane of the magnetic recording medium 44. A grating pattern 7AR having a pitch pt1 of 188 μm is formed on the reflecting plane of the reflecting body 47. Furthermore, a grating pattern 7BR having a pitch pt2 of 50 μm is formed on the reflecting plane of the magnetic recording medium 44. A track pitch of the grating pattern having a pitch of 188 μm is the same as the track pitch of broadly used floppy disks having a diameter of 3.5 inches or 5 inches called 2 DD or 2 HD, and thus the grating patterns 7AR, 7BR provide tracks.

The reflecting body 47 comprises a glass substrate and the grating pattern 7AR is formed by depositing a metal such as aluminum and chromium thereon. The magnetic recording medium 44 comprises a polyester substrate applied with a magnetic substance and the grating pattern 7BR on the magnetic recording medium 44 is formed by pressing. The beams 70A, 70B radiated to the magnetic recording medium 44 and the reflecting body 47 each comprise three beams 70AA to 70AC, 70BA to 70BC respectively generated by the diffraction grating 32. The beams 70BA to 70BC radiate areas different from each other by pt1/4 with respect to the pitch pt1. Further, beams 70AA to 70AC radiate areas different from each other by pt2/4 with respect to the pitch pt2.

The beams 70A, 70B reflected and deflected by the magnetic recording medium 44 and the reflecting body 47 are converted to linearly polarized beams having the polarization orientation forming a 90° angle compared to the polarization orientation when radiated from the light source 10 by passing through the object lens 26 again and a ¼ wavelength plate 36. The beams 70A, 70B after passing through the ¼ wavelength plate 36 pass through the polarizing beam splitter 35 and enter the converging lens 27. The beams 70A, 70B are converged by the areas 27A, 27B of the converging lens 27 and sensed by the photodetector 55 to be converted to electric signals.

Figure 29:
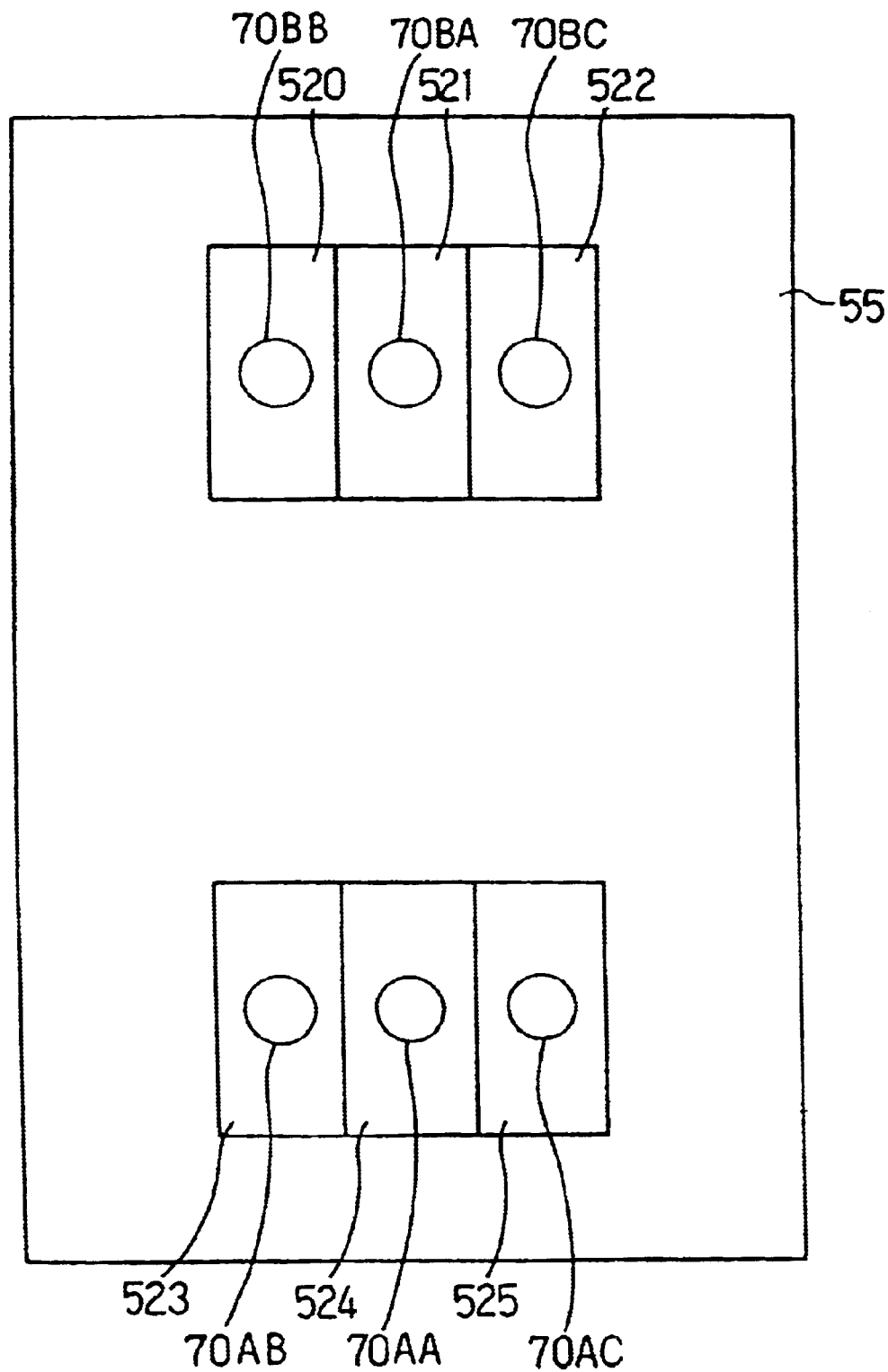
FIG. 29 is a diagram illustrating the relationship between beams on an photodetector and sensing portions in the twelfth embodiment.

FIG. 29 illustrated the beams 70AA to 70AC, 70BA to 70BC on the photodetector 55 and the sensing portions 520 to 525 formed on the photodetector 55. The beam 70AA is sensed by the sensing portion 524. Similarly, the beam 70AB is sensed by the sensing portion 523, the beam 70AC by the sensing portion 525, the beam BA by the sensing portion 521, the beam 70BB by the sensing portion 520, and the beam 70BC by the sensing portion 522, respectively.

Electric signals outputted from the photodetector 55 are inputted to the signal processing portion. Examples of a signal processing portion include a signal processing portion 83 of the third embodiment illustrated in FIG. 12. Signals outputted from the sensing portions 520 to 522, and 523 to 525 are similar to the signals outputted from the sensing portions 503 to 505 of the second embodiment illustrated in FIG. 11, and any preferred one of the signals outputted from the sensing portions 520 to 522 or from the sensing portions 523 to 525 can be inputted to the signal processing portion according to the magnetic recording medium.

Tracking error signals outputted from the signal processing portion are inputted to the driving portion 94. The driving portion 94 adjusts the relative position between the magnetic recording media 44, 48 and the base 89 including the tracking error signal detection optical system and the magnetic heads 99, 100 for tracking the magnetic heads 99, 100 on the desired tracks. Since tracking error signals are detected optically in the twelfth embodiment, an accurate tracking is enabled even when an inexpensive DC motor is used in the driving portion.

In the magnetic recording apparatus of the twelfth embodiment, since signals outputted from the sensing portions 70BA to 70BC are used for tracking operation for the magnetic recording medium 48 having a track pitch of 188 μm and signals outputted from the sensing portions 70AA to 70AC for tracking operation for the magnetic recording medium 44 having a track pitch of 50 µm, recording and reproduction of information can be enabled in a plural kinds of magnetic recording media having different track pitches.

The pitches of the grating patterns to be formed on a magnetic recording medium 44 and a reflecting body 47 illustrated in FIGS. 28A and 28B are examples thereof, and a magnetic recording apparatus of the twelfth embodiment can be applied to an optional track pitch by designing the optical system properly.

Although the mirrors 37, 38 are used in the twelfth embodiment to deflect the optical path of the beams 70A, 70B, the same effect can be realized with other optical elements such as a prism and a diffraction grating.

Further, when a sufficient amount of light of the beams 70A, 70B sensed by the photodetector 55 exists, a half mirror can be used in place of the polarizing beam splitter 35. In this case, the ¼ wavelength plate 36 becomes unnecessary, and thus an inexpensive magnetic recording apparatus can be provided.

Thirteenth Embodiment

The thirteenth embodiment concerning a magnetic recording medium and the tracking error signal detection apparatus of the present invention will be explained with reference to FIGS. 30, and 31A to 31C. FIG. 27 illustrates the configuration of a magnetic recording apparatus and the tracking error signal detection apparatus of the thirteenth embodiment.

Figure 30:
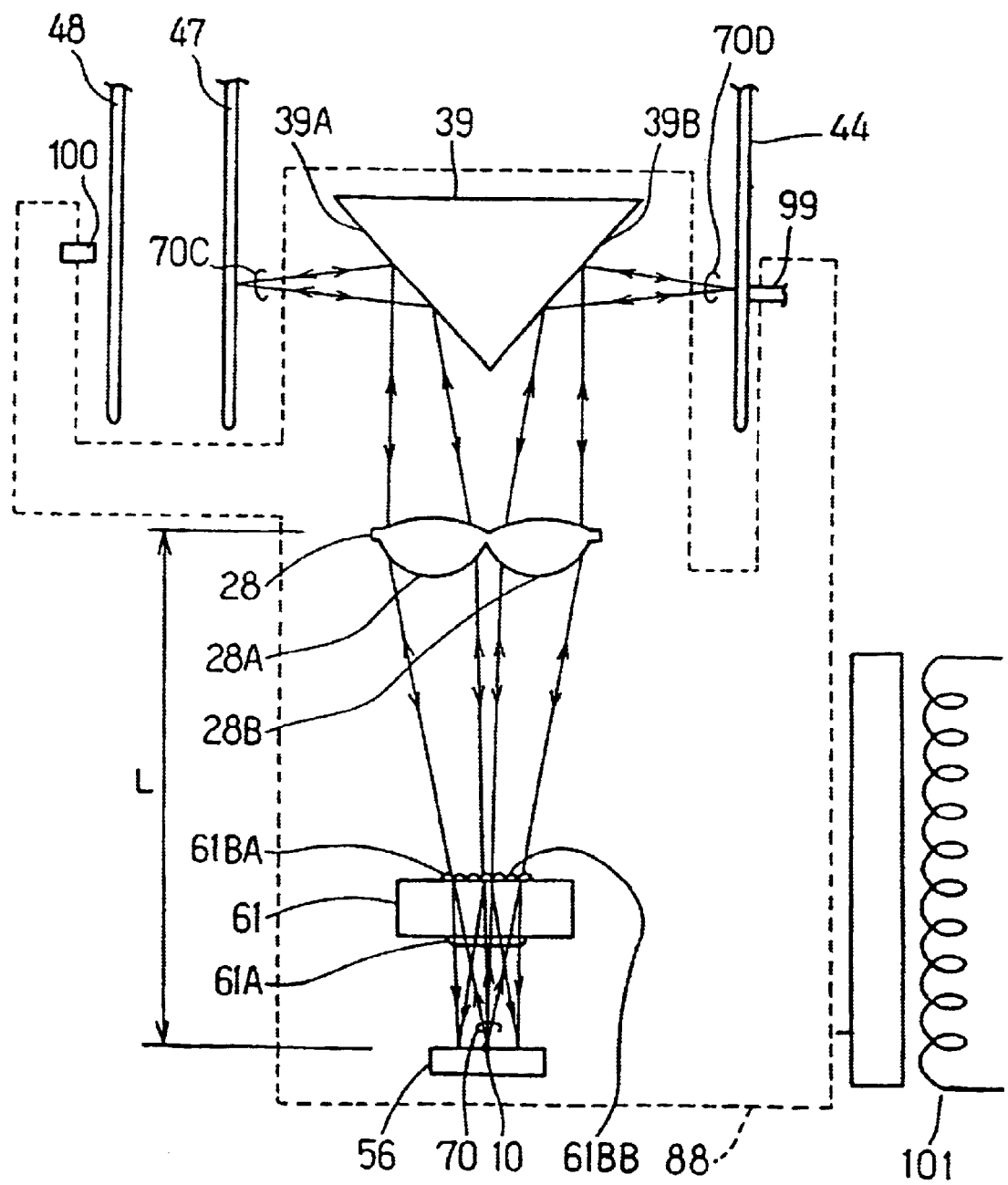
FIG. 30 is a diagram illustrating the configuration of a magnetic recording apparatus and the tracking error signal detection apparatus in the thirteenth embodiment of the present invention.
Figure 31:
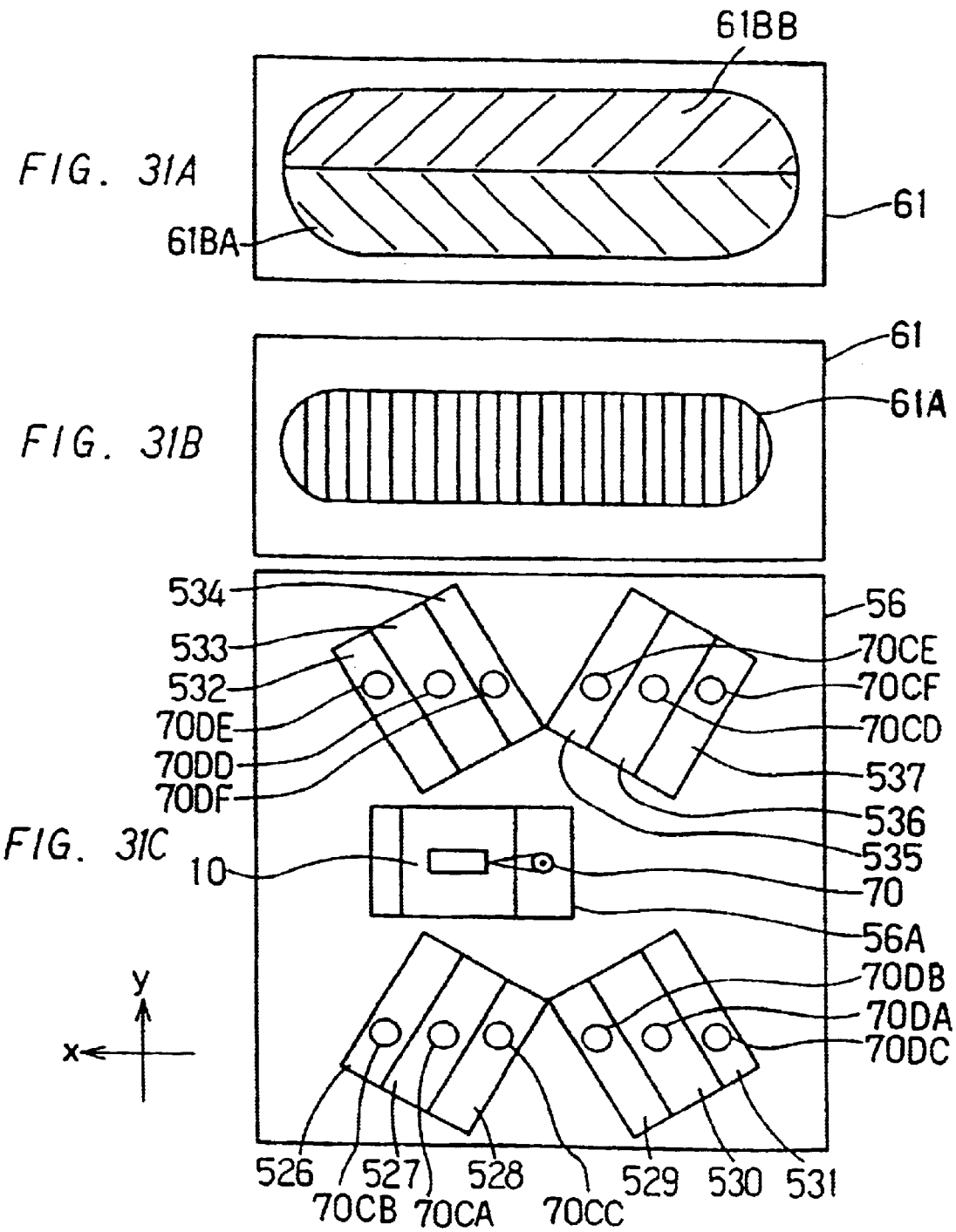
FIGS. 31A and 31B are diagrams illustrating the area of the diffraction element in the thirteenth embodiment.
FIG. 31C is a diagram illustrating the relationship between light beams on an photodetector and sensing portions of the thirteenth embodiment of the present invention.

In FIG. 30, the linearly polarized divergent beam 70 radiated from the semiconductor laser light source 10 enters the area 61A of the diffraction element 61 to become three beams, which are zeroth-order diffraction light and ±first-order diffraction lights. The three beams generated at the area 61A further generate a plurality at the areas 61BA and 61BB. The grating pitch of the areas 61BA, 61BB is designed so that only the zeroth-order diffraction light among the diffracted lights generated at the areas 61BA and 61BB enters the aperture of the lens 28 in the optical path extending from the light source 10 to the object lens 28. The lens 28 is a finite object lens for entering different portions of the beam 70 into the areas 28A, 28B to have two kinds of beams 70C, 70D. The object lens 28 can be formed, for example, by molding a plastic.

After being reflected by the areas 39A, 39B of the mirror 39, the beams 70C, 70D are focused on the reflecting body 47 and the magnetic recording medium 44. Like the twelfth embodiment, a grating pattern 7AR having a pitch pt1 of 188 µm is formed on the reflecting body 47. When the magnetic recording medium 44 has a track pitch narrower than 188 µm, a pattern corresponding to the track pitch is formed on the magnetic recording medium 44. The beams 70C, 70D reflected and diffracted by the reflecting body 47 and the magnetic recording medium 44 pass through the object lens 28 again and enter the areas 61BA, 61BB of the diffraction element 61, respectively. The beams entering the areas 61BA, 61BB generate a plurality of diffraction lights, and the ±first-order diffraction lights are sensed by the photodetector 56.

FIG. 31(a) illustrates the area 61BA, 61BB of the diffraction element 61. FIG. 31(b) illustrates the area 61A of the diffraction element 61. FIG. 31(c) illustrates the beams 70CA to 70CF, 70DA to 70DF on the photodetector 56 and the sensing portions 526 to 537 formed on the photodetector 56. The beams 70CA, 70CB. 70CC are +first-order diffraction lights generated by the incidence of the beam 70C into the area 16BA. The beams 70CD, 70CE, 70CF are −first-order diffraction lights generated by the incidence of the beam 70C into the area 16BA. The beams 70DA, 70DB, 70DC are +first-order diffraction lights generated by the incidence of the beam 70D into the area 16BB. The beams 70DD, 70DE, 70DF are −first-order diffraction lights generated by the incidence of the beam 70D into the area 16BB.

The beam 70CA is sensed by the sensing portion 527. Similarly, the beam 70CB is sensed by the sensing portion 526, the beam 70CC by the sensing portion 528, the beam 70CD by the sensing portion 536, the beam 70CE by the sensing portion 535, the beam 70CF by the sensing portion 537, the beam 70DA by the sensing portion 530, the beam 70DB by the sensing portion 529, the beam 70DC by the sensing portion 531, the beam 70DD by the sensing portion 533, the beam 70DE by the sensing portion 532, and the beam 70DF by the sensing portion 534, respectively.

Signals outputted from the sensing portions 527 and 536, 526 and 535, 528 and 537, 530 and 533, 529 and 532, 531 and 534, combined respectively, are similar to the signals outputted from the sensing portions 520 to 525 in the first embodiment, and tracking error signals can be obtained by inputting these signals into, for example, a signal processing portion 83 of the third embodiment illustrated in FIG. 12. The tracking error signals generated are supplied to the driving portion 101 so as to place the magnetic heads 99, 100 on a favorable track.

In the thirteenth embodiment, the light source 10 is arranged on the photodetector 56 comprising an etched silicon substrate. A light beam 70 is radiated from the light source 10 so that the optical path thereof after being reflected by a mirror 56A will be perpendicular to the plane in which the sensing portions 526 to 537 of the photodetector 56 are formed on the silicon substrate.

The apparatus is designed so that the beams 70C, 70D reflected by the reflecting body 47 and the magnetic recording medium 44 are sensed by the photodetector 56 on which the light source is arranged. Since the finite object lens 28 is used, a downsizing of the magnetic recording apparatus can be realized. Further, since the lengths from the light source 10 to the area 28A and the light source 10 to the area 28B are the same, the lens 28 can be formed with one part, which can be formed by one molding to have the areas 28A, 28B. Accordingly, a magnetic recording apparatus can be provided at a low cost.

Although a focus servo is not mentioned in the thirteenth embodiment, it can be employed as needed. Further, the magnetic recording apparatus of the thirteenth embodiment can be used without any limitation from the detection method of the focus error signal, and thus methods generally used in the optical disk apparatus, such as the astigmatism method, the Foucault method, and the spot size detection method can be used. Besides, although the example of a semiconductor laser for the light source is explained herein, other kinds of light sources such as an inexpensive light emitting diode can be used depending upon the track pitch and the numerical aperture of the lens.

Fourteenth Embodiment

Figure 32:
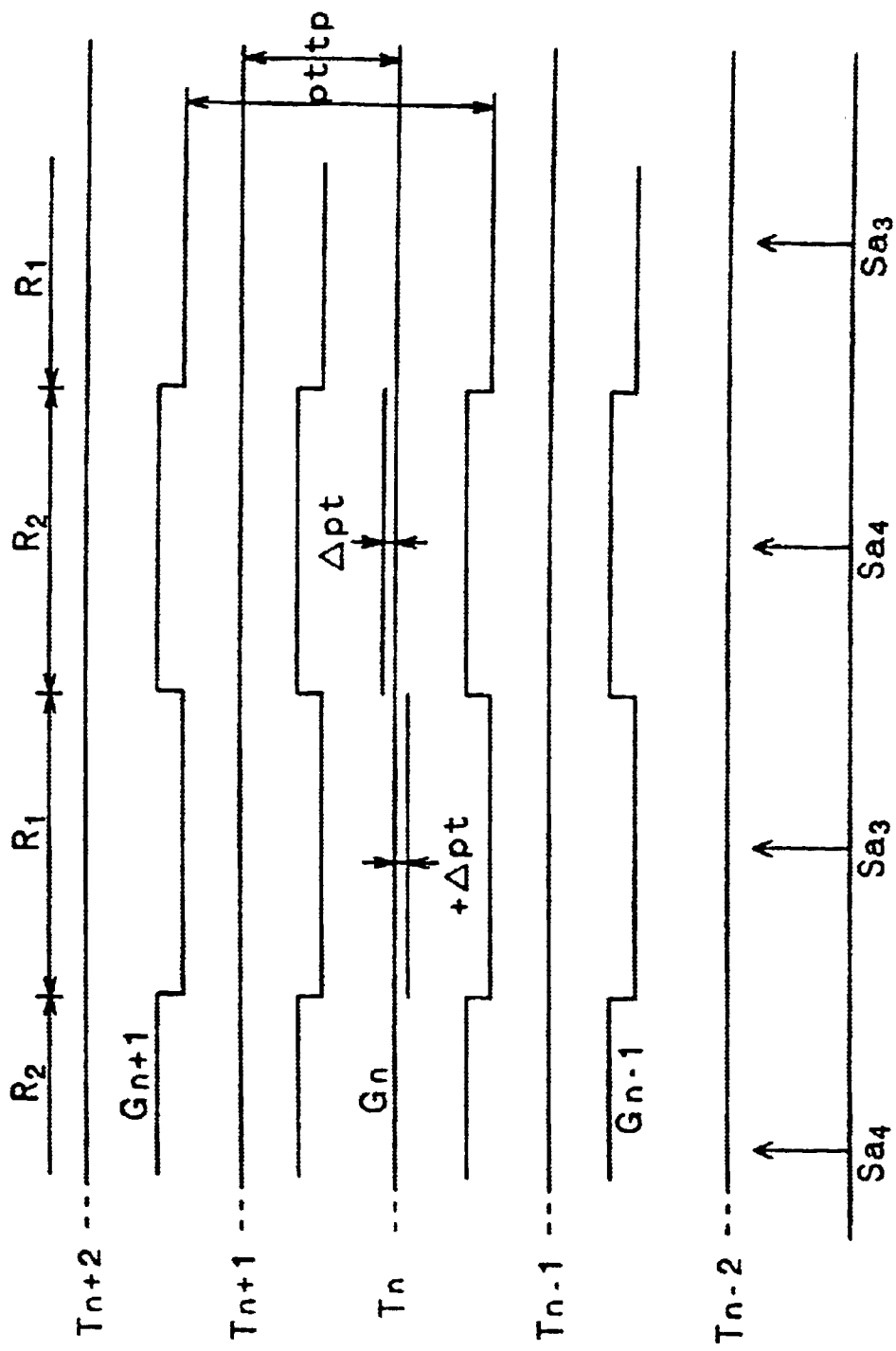
FIG. 32 is a diagram illustrating the configuration of an information recording medium in the fourteenth embodiment of the present invention.

The fourteenth embodiment concerning an information recording medium, an information recording apparatus and the tracking error signal detection apparatus of the present invention will be explained with reference to FIGS. 32 and 33. FIG. 32 illustrates the configuration of an information recording medium of the fourteenth embodiment. The information recording medium of the fourteenth embodiment relates to an optical disk whereas the above mentioned first to thirteenth embodiments mainly relate to magnetic recording media and magnetic recording apparatus. That is, tracking error signal detection apparatus of the present invention can be applied not only in magnetic recording media such as floppy disks but also in optical disks. Further, as the optical system of the information recording. apparatus and the tracking error detection apparatus of the fourteenth embodiment, for example, the optical system of the first embodiment illustrated in FIG. 5 can be employed.

In FIG. 32, Gn−1, Gn, Gn+1, . . . denote guiding grooves as the pattern for enabling the detection of tracking error signals. pt denotes a pitch of an adjacent guiding groove. Tn−1, Tn, Tn+1, . . . denote tracks by which recording and reproduction of information are conducted. The tracks Tn−1, Tn, Tn+1, . . . are arranged on and between the guiding grooves Gn−1, Gn, Gn+1, . . . tp is a pitch of an adjacent track. Accordingly, pt=2·tp.

The guiding grooves Gn-1, Gn, Gn+1, . . . have cyclical two patterns R1, R2. The patterns R1, R2 are formed in a position different by ±Δpt to the orientation perpendicular to the track, respectively. Here pt=1.48 µm, tp=0.74 µm, and Δpt=0.04 µm.

Figure 33:
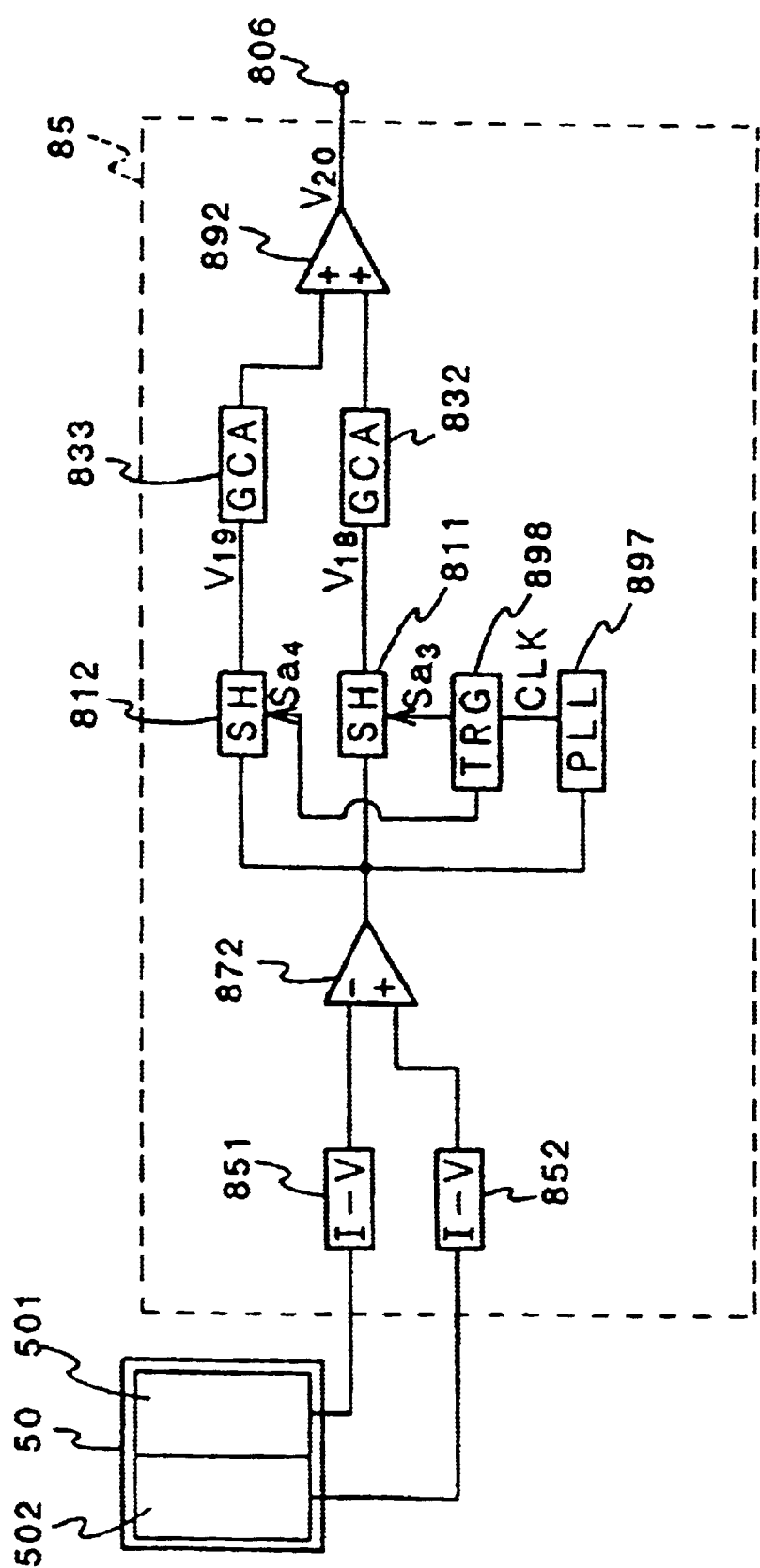
FIG. 33 is a diagram illustrating the configuration of a signal processing portion of a tracking error signal detection apparatus in the fourteenth embodiment.

FIG. 33 illustrates the configuration of a signal processing portion 85 in an information recording apparatus and the tracking error signal detection apparatus of the fourteenth embodiment. Signals outputted from the sensing portions 501, 502 of the photodetector. 50 are converted to voltage signals by the I-V converting portions 851, 852, respectively. Signals outputted from the I-V converting portions 851, 852 are subtracted by the differential operation part 872. Signals outputted from the differential operation part 872 are inputted to the clock signal generating portion 897 to generate clock signals CLK for synchronizing the cycles of the patterns R1, R2. The clock signal generating portion 897 is a Phase Locked Loop (PLL) circuit. The clock signals CLK are inputted to the trigger signal generating portion 898 to generate timing signals Sa3, Sa4.

Signals outputted from the differential operation part 872 are sampled and held by the sample and hold portions 811, 812 with the timing of the timing signals Sa3, Sa4, respectively. Signals v18, v19 outputted from the sample and hold portions 811, 182 are signals represented by the below mentioned formulae (20) and (21). In the formulae (21) and (22), A10 denotes an amplitude.

$$v18 = A10 \cdot \sin(2\pi(x - \Delta pt)/pt) \quad (20)$$

$$v19 = A10 \cdot \sin(2\pi(x + \Delta pt)/pt) \quad (21)$$

Signals sampled and held by the sample and hold portions 811, 812 are, after being adjusted to a preferable intensity by the changeable gain amplifying portions 832, 833, inputted to the operation part 892. The operation part 892 adds the inputted signals and outputs tracking error signals v20 to the output terminal 806. The signals v20 have a wave form represented by the below mentioned formula (22).

$$v20 = K1 \cdot A10 \cdot \sin(2\pi(x - \Delta pt)/pt) + K2 \cdot A10 \cdot \sin(2\pi(x + \Delta pt)/pt) \quad (22)$$

In the formula (22), K1, K2 are gains of the changeable gain amplifying parts 832, 833, respectively. Optional phase and amplitude can be set for a signal v20 by selecting appropriate gains K1, K2 as in the first embodiment. However, in order to tolerate all the phase dislocations with small Δpt, K1, K2 need to be changed drastically, and thus it is not practical. Tracking error signal detection apparatus of the fourteenth embodiment are suitable for optical disk apparatus having a phase dislocation of tracking error signals smaller than pt/2.

Since a tracking error signal detection apparatus of the fourteenth embodiment obtains a plurality of signals having different phases from a light beam, it is barely affected even when the information recording medium has a decentering. Accordingly, information recording apparatus using a tracking error signal detection apparatus of the fourteenth embodiment have a high reliability in recording and reproducing on an information recording medium having a decentering.

Furthermore, since information is recorded or reproduced on or between the patterns R1, R2 for detecting tracking error signals, recording capacity of the information recording medium is not reduced, and thus an optical information recording apparatus having a large capacity and high reliability can be provided.

While certain preferred embodiments of the present invention has been shown and described, it is to be distinctly understood that the invention is not limited thereto but may be otherwise variously embodied within the scope of the following claims.

What is claimed is:

1. A tracking error signal detection apparatus comprising:
   a light source to radiate a light beam;
   a converging optical system to converge the light beam radiated from the light source on a reflecting body in a minute spot;
   a beam splitting means to split the light beam reflected and diffracted by the reflecting body;
   a photodetector to sense the beam split by the beam splitting means and output a signal according to the quantity of light; and
   a signal processing portion to process a signal outputted from the photodetector to generate a tracking error signal;
   wherein a physical change which brings a change of reflectivity is formed on the reflecting body, a light beam is converged on the reflecting body so that the size of the light beam in a direction parallel to the physical change is larger than the size of the light beam in a direction orthogonal to the physical change,
   wherein the size of an aperture of the converging optical system at the reflecting body side in the direction parallel to the physical change is larger than the size of the aperture in the direction orthogonal to the physical change, and
   wherein a light beam reflected by the reflecting body as well as a light beam traveling from the light source to the reflecting body passes through the aperture of different sizes.

2. The tracking error signal detection apparatus according to claim 1, wherein the converging optical system comprises a collimator to convert a divergent beam radiated from the light source to a parallel light beam, and a converging lens to convert the parallel light beam converted by the collimator to a convergent light beam.

3. The tracking error signal detection apparatus according to claim 1, wherein the converging optical system comprises a finite object lens to convert a divergent light beam radiated from the light source to a convergent light beam.

4. The tracking error signal detection apparatus according to claim 1, wherein the beam splitting means is a diffraction element.

5. The tracking error signal detection apparatus according to claim 1, wherein the beam splitting means is a polarizing beam splitter.

6. The tracking error signal detection apparatus according to claim 1, wherein the physical change formed on the reflecting body is smaller than the track on the information recording medium.

7. The tracking error signal detection apparatus according to claim 1, wherein the reflecting body is an information recording medium.

8. A tracking error signal detection apparatus comprising:
a light source to radiate a light beam;
a converging optical system to converge the light beam radiated from the light source on a reflecting body in a minute spot;
a beam splitting means to split the light beam reflected and diffracted by the reflecting body;
a photodetector to sense the beam split by the beam splitting means and output a signal according to the quantity of light; and
a signal processing portion to process a signal outputted from the photodetector to generate a tracking error signal,
wherein a physical change which brings a change of reflectivity is formed on the reflecting body, and the focal length of the converging optical system at the reflecting body side in a direction parallel to the physical change is longer than the focal length in a direction orthogonal to the physical change.

9. The tracking error signal detection apparatus according to claim 8, wherein the focal length of the converging optical system at the reflecting body side of the orientation parallel to the physical change is infinite.

10. The tracking error signal detection apparatus according to claim 8, wherein the converging optical system comprises a collimator to convert a divergent beam radiated from the light source to a parallel light beam, and a converging lens to convert the parallel light beam converted by the collimator to a convergent light beam.

11. The tracking error signal detection apparatus according to claim 8, wherein the converging optical system comprises a finite object lens to convert a divergent light beam radiated from the light source to a convergent light beam.

12. The tracking error signal detection apparatus according to claim 8, wherein the converging optical system is formed by molding a plastic.

13. The tracking error signal detection apparatus according to claim 8, wherein the beam splitting means is a diffraction element.

14. The tracking error signal detection apparatus according to claim 8, wherein the beam splitting means is a polarizing beam splitter.

15. The tracking error signal detection apparatus according to claim 7, wherein the physical change formed on the reflecting body is smaller than the track on the information recording medium.

16. The tracking error signal detection apparatus according to claim 8, wherein the reflecting body is an information recording medium.

17. The tracking error signal detection apparatus according to claim 8, wherein the size of the aperture of the converging optical system at the reflecting body side of the orientation parallel to the physical change is larger than the aperture of the orientation orthogonal to the physical change.

* * * * *